United States Patent
Annis

(10) Patent No.: US 10,740,638 B1
(45) Date of Patent: Aug. 11, 2020

(54) DATA ELEMENT PROFILES AND OVERRIDES FOR DYNAMIC OPTICAL CHARACTER RECOGNITION BASED DATA EXTRACTION

(71) Applicant: Business Imaging Systems, Inc., Edmond, OK (US)

(72) Inventor: David Annis, Edmond, OK (US)

(73) Assignee: BUSINESS IMAGING SYSTEMS, INC., Edmond, OK (US)

( * ) Notice: Subject to any disclaimer, the term of this patent is extended or adjusted under 35 U.S.C. 154(b) by 217 days.

(21) Appl. No.: 15/858,297

(22) Filed: Dec. 29, 2017

Related U.S. Application Data

(60) Provisional application No. 62/440,777, filed on Dec. 30, 2016.

(51) Int. Cl.
　　*G06K 9/20*　　(2006.01)
　　*G06K 9/62*　　(2006.01)
　　*G06K 9/64*　　(2006.01)

(52) U.S. Cl.
　　CPC ......... *G06K 9/2063* (2013.01); *G06K 9/626* (2013.01); *G06K 9/64* (2013.01)

(58) Field of Classification Search
　　CPC ......... G06K 9/2063; G06K 9/626; G06K 9/64
　　See application file for complete search history.

(56) References Cited

U.S. PATENT DOCUMENTS

| | | | | |
|---|---|---|---|---|
| 5,909,539 | A * | 6/1999 | Chikauchi | G06T 11/206 358/1.18 |
| 6,278,465 | B1 * | 8/2001 | Nielsen | G06F 16/9577 345/472 |
| 6,282,314 | B1 * | 8/2001 | Sugiura | G06K 9/00456 358/453 |
| 9,251,413 | B2 | 2/2016 | Meier et al. | |
| 9,672,497 | B1 * | 6/2017 | Lewis | G06F 40/284 |
| 2001/0002842 | A1 * | 6/2001 | Ozawa | A61B 1/00039 348/45 |
| 2001/0043740 | A1 * | 11/2001 | Ichikawa | G06K 9/00449 382/176 |
| 2002/0106124 | A1 * | 8/2002 | Wang | G06K 9/00449 382/173 |
| 2002/0135621 | A1 * | 9/2002 | Angiulo | G06F 16/958 715/838 |
| 2004/0022422 | A1 * | 2/2004 | Yamauchi | G07C 9/37 382/115 |

(Continued)

FOREIGN PATENT DOCUMENTS

JP　　　　2003274049 A　*　9/2003

*Primary Examiner* — Mekonen T Bekele
(74) *Attorney, Agent, or Firm* — Kevin E. West; Advent, LLP

(57) ABSTRACT

A method for dynamic optical character recognition based data extraction includes: analyzing an image; detecting a first identifier associated with a first content type in an image; providing a first data extraction model for the first content type, the first data extraction model including definitions for a plurality of data types; performing an optical character recognition pass on the image to identify a plurality of characters of the image; and extracting a set of data elements from the image based on the first data extraction model and the plurality of characters of the image identified by performing the optical character recognition pass on the image.

20 Claims, 23 Drawing Sheets

(56) References Cited

U.S. PATENT DOCUMENTS

| | | | | |
|---|---|---|---|---|
| 2006/0007481 A1* | 1/2006 | Kato | ......... | H04N 1/00209 |
| | | | | 358/1.15 |
| 2006/0010115 A1* | 1/2006 | Yoshida | ......... | G06F 16/56 |
| 2008/0244378 A1* | 10/2008 | Chen | ......... | G06K 9/00456 |
| | | | | 715/226 |
| 2009/0174911 A1* | 7/2009 | Suzuki | ......... | H04N 1/2166 |
| | | | | 358/474 |
| 2011/0019926 A1* | 1/2011 | Saito | ......... | H04N 1/32128 |
| | | | | 382/218 |
| 2013/0223743 A1* | 8/2013 | Deryagin | ......... | G06K 9/00469 |
| | | | | 382/180 |
| 2014/0025443 A1* | 1/2014 | Onischuk | ......... | G07C 13/00 |
| | | | | 705/12 |
| 2014/0185934 A1* | 7/2014 | Lukehart | ......... | G06K 9/00469 |
| | | | | 382/182 |
| 2014/0348430 A1* | 11/2014 | Yasui | ......... | G06K 9/2063 |
| | | | | 382/190 |
| 2014/0369602 A1* | 12/2014 | Meier | ......... | G06K 9/00463 |
| | | | | 382/182 |
| 2016/0055376 A1* | 2/2016 | Koduru | ......... | G06K 9/00449 |
| | | | | 382/176 |
| 2019/0102649 A1* | 4/2019 | Ackley | ......... | G06K 9/6212 |

* cited by examiner

700

- Patent Application - Hierarchical Modeling
  + (local resources)
  + (data model) — 702
  - Category 1 — 704
    - Sub Category i — 706
      - Document Type A
      - Document Type B
    - Sub Category ii — 706
      - Document Type C
      - Document Type D
  - Category 2 — 704
    - Sub Category iii — 706
      - Document Type E
      - Document Type F
    - Sub Category iv — 706
      - Document Type G
      - Document Type H

Document Title — 801

┌─────────────────────────────────────┐
January 2018 — 802
┌─────────────────────────────────┐
Category: A1 — 804

Col A | Col B | Col C | Col D
AAAAA | $1.00 | 11111 | John
BBBBB | $2.50 | 22222 | Jason
CCCCC | $3.25 | 33333 | Matt Total Entries: 3 — 804
Total Value: $6.75 — 804
└─────────────────────────────────┘

┌─────────────────────────────────┐
Category: B7

Col A | Col B | Col C | Col D
AAAAA | $1.00 | 11111 | Dan
BBBBB | $5.50 | 22222 | Tim
CCCCC | $3.25 | 33333 | Jacob Total Entries: 3
Total Value: $9.75
└─────────────────────────────────┘
--- END JANUARY 2018 ---
└─────────────────────────────────────┘

806, 803, 805

February 2018 — 802

Category: C3

Col A | Col B | Col C | Col D
AAAAA | $1.00 | 11111 | Jenna
BBBBB | $2.50 | 22222 | Jimmy
CCCCC | $3.25 | 33333 | Wesley Total Entries: 3
Total Value: $6.75

Category B5:

---

Col A | Col B | Col C | Col D
AAAAA | $1.00 | 11111 | Kevin
BBBBB | $2.50 | 22222 | Kacy
CCCCC | $3.25 | 33333 | Artis Total Entries: 3
Total Value: $6.75
--- END FEBRUARY 2018 ---

808

March 2018 — 802

Category: D9

Col A | Col B | Col C | Col D
AAAAA | $2.00 | 11111 | Dustin
BBBBB | $2.50 | 22222 | Brian
CCCCC | $3.00 | 33333 | David Total Entries: 3
Total Value: $7.50

Category: A6

Col A | Col B | Col C | Col D
AAAAA | $1.00 | 11111 | Scott
BBBBB | $2.50 | 22222 | J.T.
CCCCC | $3.25 | 33333 | Steve Total Entries: 3
Total Value: $6.75
--- END MARCH 2018 ---

FIG. 8

Document Title (Style B) — 901

900
903

2018, Month of January — 902

Category is below:
A1
} 904

908

| Col X | Col A | Col X | Col B | Col X | Col C | Col X | Col D |
|-------|-------|-------|-------|-------|-------|-------|-------|
| XXXXX | AAAAA | XXXXX | $1.00 | XXXXX | 11111 | XXXXX | John |
| XXXXX | BBBBB | XXXXX | $2.50 | XXXXX | 22222 | XXXXX | Jason |
| XXXXX | CCCCC | XXXXX | $3.25 | XXXXX | 33333 | XXXXX | Matt |

$6.75 = SUM — 906

910

Category is below:
B7
} 904

908

| Col X | Col A | Col X | Col B | Col X | Col C | Col X | Col D |
|-------|-------|-------|-------|-------|-------|-------|-------|
| XXXXX | AAAAA | XXXXX | $1.00 | XXXXX | 11111 | XXXXX | Dan |
| XXXXX | BBBBB | XXXXX | $5.50 | XXXXX | 22222 | XXXXX | Tim |
| XXXXX | CCCCC | XXXXX | $3.25 | XXXXX | 33333 | XXXXX | Jacob |

$9.75 = SUM — 906

910

--- END JANUARY 2018 ---

2018, Month of February — 902

Category is below:
C3

| Col X | Col A | Col X | Col B | Col X | Col C | Col X | Col D |
|-------|-------|-------|-------|-------|-------|-------|-------|
| XXXXX | AAAAA | XXXXX | $1.00 | XXXXX | 11111 | XXXXX | Jenna |
| XXXXX | BBBBB | XXXXX | $2.50 | XXXXX | 22222 | XXXXX | Jimmy |
| XXXXX | CCCCC | XXXXX | $3.25 | XXXXX | 33333 | XXXXX | Wesley |

$6.75 = SUM

FIG. 9

Document Title (Style B) — 901

2018, Month of January — 902                                                                         905

```
Category is below:
A1          } 904

Col X  |  Col A  |  Col X  |  Col B  |  Col X  |  Col C  |  Col X  |  Col D
XXXXX  |  AAAAA  |  XXXXX  |  $1.00  |  XXXXX  |  11111  |  XXXXX  |  John
XXXXX  |  BBBBB  |  XXXXX  |  $2.50  |  XXXXX  |  22222  |  XXXXX  |  Jason
XXXXX  |  CCCCC  |  XXXXX  |  $3.25  |  XXXXX  |  33333  |  XXXXX  |  Matt $6.75 = SUM
```

Category is below:
B7

```
Col X  |  Col A  |  Col X  |  Col B  |  Col X  |  Col C  |  Col X  |  Col D
XXXXX  |  AAAAA  |  XXXXX  |  $1.00  |  XXXXX  |  11111  |  XXXXX  |  Dan
XXXXX  |  BBBBB  |  XXXXX  |  $5.50  |  XXXXX  |  22222  |  XXXXX  |  Tim
XXXXX  |  CCCCC  |  XXXXX  |  $3.25  |  XXXXX  |  33333  |  XXXXX  |  Jacob
```

$9.75 = SUM
--- END JANUARY 2018 ---

2018, Month of February

Category is below:
C3

```
Col X  |  Col A  |  Col X  |  Col B  |  Col X  |  Col C  |  Col X  |  Col D
XXXXX  |  AAAAA  |  XXXXX  |  $1.00  |  XXXXX  |  11111  |  XXXXX  |  Jenna
XXXXX  |  BBBBB  |  XXXXX  |  $2.50  |  XXXXX  |  22222  |  XXXXX  |  Jimmy
XXXXX  |  CCCCC  |  XXXXX  |  $3.25  |  XXXXX  |  33333  |  XXXXX  |  Wesley
```

$6.75 = SUM

FIG. 10

Document Title (Style B) — 901

2018, Month of January — 902

Category is below: } 904
A1

| Col X | Col A | Col X | Col B | Col X | Col C | Col X | Col D |
|---|---|---|---|---|---|---|---|
| XXXXX | AAAAA | XXXXX | $1.00 | XXXXX | 11111 | XXXXX | John |
| XXXXX | BBBBB | XXXXX | $2.50 | XXXXX | 22222 | XXXXX | Jason |
| XXXXX | CCCCC | XXXXX | $3.25 | XXXXX | 33333 | XXXXX | Matt |

$6.75 = SUM

Category is below:
B7

| Col X | Col A | Col X | Col B | Col X | Col C | Col X | Col D |
|---|---|---|---|---|---|---|---|
| XXXXX | AAAAA | XXXXX | $1.00 | XXXXX | 11111 | XXXXX | Dan |
| XXXXX | BBBBB | XXXXX | $5.50 | XXXXX | 22222 | XXXXX | Tim |
| XXXXX | CCCCC | XXXXX | $3.25 | XXXXX | 33333 | XXXXX | Jacob |

$9.75 = SUM
--- END JANUARY 2018 ---

2018, Month of February

Category is below:
C3

| Col X | Col A | Col X | Col B | Col X | Col C | Col X | Col D |
|---|---|---|---|---|---|---|---|
| XXXXX | AAAAA | XXXXX | $1.00 | XXXXX | 11111 | XXXXX | Jenna |
| XXXXX | BBBBB | XXXXX | $2.50 | XXXXX | 22222 | XXXXX | Jimmy |
| XXXXX | CCCCC | XXXXX | $3.25 | XXXXX | 33333 | XXXXX | Wesley |

$6.75 = SUM

FIG. 11

Document Title (Style B) — 901

2018, Month of January — 902

905

Category is below: } 904
A1

908

| Col X | Col A | Col X | Col B | Col X | Col C | Col X | Col D |
|---|---|---|---|---|---|---|---|
| XXXXX | AAAAA | XXXXX | $1.00 | XXXXX | 11111 | XXXXX | John |
| XXXXX | BBBBB | XXXXX | $2.50 | XXXXX | 22222 | XXXXX | Jason |
| XXXXX | CCCCC | XXXXX | $3.25 | XXXXX | 33333 | XXXXX | Matt |

$6.75 = SUM       909       910

Category is below:
B7

| Col X | Col A | Col X | Col B | Col X | Col C | Col X | Col D |
|---|---|---|---|---|---|---|---|
| XXXXX | AAAAA | XXXXX | $1.00 | XXXXX | 11111 | XXXXX | Dan |
| XXXXX | BBBBB | XXXXX | $5.50 | XXXXX | 22222 | XXXXX | Tim |
| XXXXX | CCCCC | XXXXX | $3.25 | XXXXX | 33333 | XXXXX | Jacob |

$9.75 = SUM
--- END  JANUARY  2018 ---

2018, Month of February

Category is below:
C3

| Col X | Col A | Col X | Col B | Col X | Col C | Col X | Col D |
|---|---|---|---|---|---|---|---|
| XXXXX | AAAAA | XXXXX | $1.00 | XXXXX | 11111 | XXXXX | Jenna |
| XXXXX | BBBBB | XXXXX | $2.50 | XXXXX | 22222 | XXXXX | Jimmy |
| XXXXX | CCCCC | XXXXX | $3.25 | XXXXX | 33333 | XXXXX | Wesley |

$6.75 = SUM

FIG. 12

Document Title (Style B) — 901

2018, Month of January — 902

Category is below:
A1
} — 904

| Col X | Col A | Col X | Col B | Col X | Col C | Col X | Col D |
|-------|-------|-------|-------|-------|-------|-------|-------|
| XXXXX | AAAAA | XXXXX | $1.00 | XXXXX | 11111 | XXXXX | John  |
| XXXXX | BBBBB | XXXXX | $2.50 | XXXXX | 22222 | XXXXX | Jason |
| XXXXX | CCCCC | XXXXX | $3.25 | XXXXX | 33333 | XXXXX | Matt  |

$6.75 = SUM — 906

Category is below:
B7

| Col X | Col A | Col X | Col B | Col X | Col C | Col X | Col D |
|-------|-------|-------|-------|-------|-------|-------|-------|
| XXXXX | AAAAA | XXXXX | $1.00 | XXXXX | 11111 | XXXXX | Dan   |
| XXXXX | BBBBB | XXXXX | $5.50 | XXXXX | 22222 | XXXXX | Tim   |
| XXXXX | CCCCC | XXXXX | $3.25 | XXXXX | 33333 | XXXXX | Jacob |

$9.75 = SUM

--- END JANUARY 2018 ---

2018, Month of February

Category is below:
C3

| Col X | Col A | Col X | Col B | Col X | Col C | Col X | Col D  |
|-------|-------|-------|-------|-------|-------|-------|--------|
| XXXXX | AAAAA | XXXXX | $1.00 | XXXXX | 11111 | XXXXX | Jenna  |
| XXXXX | BBBBB | XXXXX | $2.50 | XXXXX | 22222 | XXXXX | Jimmy  |
| XXXXX | CCCCC | XXXXX | $3.25 | XXXXX | 33333 | XXXXX | Wesley |

$6.75 = SUM

FIG. 13

DATA ELEMENT PROFILES AND OVERRIDES FOR DYNAMIC OPTICAL CHARACTER RECOGNITION BASED DATA EXTRACTION

CROSS-REFERENCE TO RELATED APPLICATIONS

The present application claims the benefit under 35 U.S.C. § 119(e) of U.S. Provisional Application Ser. No. 62/440,777, filed Dec. 30, 2016, and titled "DATA ELEMENT PROFILES AND OVERRIDES FOR DYNAMIC OPTICAL CHARACTER RECOGNITION BASED DATA EXTRACTION," which is incorporated herein by reference in its entirety.

BACKGROUND

Optical character recognition (OCR) can be used to convert an image (e.g., scan, picture, screenshot, etc.) into a searchable text document, such as a .doc file, .txt file, or the like. OCR can also be used to simply extract text from an image. For example, text may be extracted from an image and entered into a database for billing or payment processing, claim processing, maintaining profiles of various individuals, and so forth.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 7 shows an example of data element hierarchies and classifications that are employed by an OCR system, such as the system illustrated in FIG. 1, to classify documents and/or extract data from documents, in accordance with an example implementation of the present disclosure.

FIG. 8 shows an example of a source document that can be analyzed by an OCR system, such as the system illustrated in FIG. 1, by employing one or more processes (e.g., any of the processes illustrated in FIGS. 3 through 6D) to perform document classification and/or data extraction, wherein a first data type (e.g., a heading) in an image that indicates a location of a first portion (e.g., section) of the image, in accordance with a first example content type/classification.

FIG. 9 shows an example of a source document that can be analyzed by an OCR system, such as the system illustrated in FIG. 1, by employing one or more processes (e.g., any of the processes illustrated in FIGS. 3 through 6D) to perform document classification and/or data extraction, wherein a first data type (e.g., a heading) in an OCR image of the source document indicates a location of a first portion (e.g., section) of the image, in accordance with a second example content type/classification.

FIG. 10 shows another example of the source document illustrated in FIG. 9, wherein a second data type (e.g., a sub-heading) in the image indicates a location of a second portion (e.g., sub-section or table) of the image, and the second portion of the image is located in the first portion of the image, in accordance with the second example content type/classification.

FIG. 11 shows another example of the source document illustrated in FIG. 9, wherein a third data type (e.g., a table heading) in the image indicates a location of a third portion (e.g., table) of the image, where the third portion of the image is also located in the first portion of the image and is nested below or within the second portion of the image, in accordance with the second example content type/classification.

FIG. 12 shows another example of the source document illustrated in FIG. 9, wherein a fourth data type (e.g., a table) in the image indicates a location of a fourth portion (e.g., table) of the image, where the fourth portion of the image is also located in the first portion of the image and is nested below or within second and third portions of the image, in accordance with the second example content type/classification.

FIG. 13 shows another example of the source document illustrated in FIG. 9, wherein a fifth data type in an image indicates a location of a fifth portion (e.g., field) of the image, where the fifth portion of the image is also located in the first portion of the image and is nested below or within second, third, and fourth portions of the image, in accordance with the second example content type/classification.

DETAILED DESCRIPTION

Overview

Figure 1:
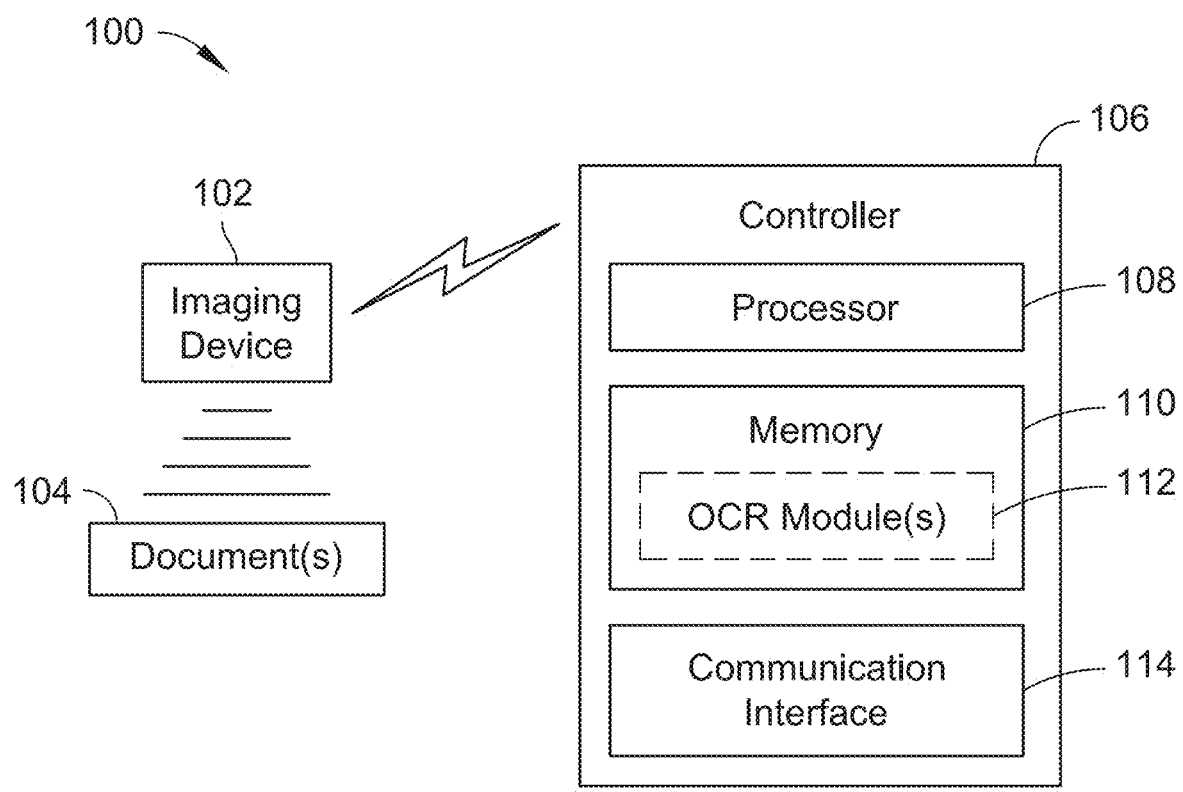
FIG. 1 is block diagram illustrating a system for OCR analysis, in accordance with an example embodiment of the present disclosure.

OCR is the optical recognition of text characters contained within a digitized image. OCR can be used to turn a rasterized image into useable text. OCR is used in many document imaging and data capture applications to extract data elements from a document.

There are many scenarios where data elements need to be extracted from a document in a different manner than that of another document due to the document's classification and/or formatting. For example, some systems extract information from documents based on pre-drawn zones configured within document templates. In such cases, documents with different formatting and/or different data types must be processed according to different templates. In another example, a hierarchical data model can be used for extracting data elements from a document. Data types can be predefined (e.g., programmed in memory) and/or dynamically defined by an administrator (e.g., via user inputs). For example, the data types can be associated with respective patterns of characters and arranged in a hierarchical model that relates the data types with one another (e.g., data types can be nested within sections defined by other data types, and so forth). In such cases, documents with different data elements to be collected will need to be processed according to different hierarchical models that will include instructions for collecting those differing data elements. The current solution for dealing with different document formats is to presort the documents, which imposes a great burden on the user.

Content type classifies the document being processed. For example, content type may include, but is not limited to, content category, document type, and form type. Categories are used as an organizational unit to better organize large lists of related document types. Document types exist to differentiate one document from another, for example, Sales Order, Invoice, Purchase Order, Shipping Confirmation. Each of these may contain different data elements to be collected. Form types exist because some document types have multiple variations. Each form type is essentially a variation of a document type. Example content models for an invoice processing solution are provided below.

I. Content Category—PO-Based Invoices
        1. Document Type—Vendor 1
            i. Form Type—1 page variation
            ii. Form Type—2 page variation
        2. Document Type—Vendor 2
            i. Form Type—1 page variation
        3. Document Type—Vendor 3
            i. Form Type—3 page variation
    II. Content Category—Non PO-Based Invoices
        1. Document Type—Vendor A
            i. Form Type—1 page variation
        2. Document Type—Vendor B
            i. Form Type—1 page variation
        3. Document Type—Vendor C
            i. Form Type—1 page variation The use of categories in the example above allows the OCR system to organize a list of vendor document types based on whether or not the vendor uses POs. The OCR system can then apply instructions for one or more data elements for all vendors within the category by specifying the instructions only one time at the category level. Without this mechanism in place, it is necessary to set the rule for each document type independently, which would be cumbersome and difficult to maintain over time. If a PO Number is to be collected from each document, the OCR system can simply disable the PO number field completely for those invoices that are known to not have a PO number (e.g., based on the content type).

A data type in its simplest form is a regular expression pattern that identifies a sequence of characters on a page. In an accounting application, a pattern that would find an invoice number can be written. For example, on invoices that come from most vendors, the invoice number is in the format of a five digit number. Accordingly, the OCR system can be configured to look for such a pattern (e.g., defined as [0-9]{5}). This pattern would by default apply to any invoice regardless of vendor. Now, on invoices that come from one specific vendor, the invoice number format may be totally different. For example, it may begin with one letter, then three numbers, then another letter. In this situation, the OCR system can use a data element profile on the vendor's content type to override the invoice number field for the content model associated with that content type. In this regard, the run-time data extraction model changes from the base content model to a new model that has override instructions based on the data element profile for the vendor. For example, the data element profile/override can support a data type (e.g., "invoice number") that uses a different expression pattern (e.g., defined as [A-Z][0-9]{3}[A-Z]) than the invoice number patter used by the base content model.

A system and method are disclosed for dynamic OCR based data extraction that allow for modification of rules at any level. These modifications (sometimes referred herein to as "rule changes" or "overrides") can be configured within data element profiles. For any content category, document type, or form type, a data element profile can be created for any data element (e.g., for sections, tables, fields, and so forth). Data Elements are the values that can be extracted from a set of related documents. In implementations, there are three types of data elements: sections, tables, and fields. For example, on an invoice, the header section of the document may be identified, so that the OCR system can then identify additional fields contained therein. A "section" can be defined in a content model for the document using a region that would only include the top portion of the invoice document. Within the header section, a user may want to collect several "fields," such as: Invoice Number, PO Number, Payment Terms, Total Amount Due, etc. Each of these can be considered a field within the content model for the document. A user may also want to collect all of the line items on an invoice. As each invoice may contain one or more line items, and each line item contains multiple values, a "table" can be defined in the content model. The table would then comprise several fields, for example: Part Number, Quantity, Description, Price Each, Extended Amount, and etc. The foregoing sections, tables, and fields are provided as examples for explanatory purposes, and it is to be understood that several different types of sections, tables, and/or fields can be employed depending on the document(s) being analyzed.

Once a data element profile is created, a series of properties can be altered that will only apply to that data element on documents assigned to that parent content category or document type. In an implementation, a method for dynamic OCR based data extraction can include the following. A first data extraction model (e.g., a base hierarchical model) can be provided for a first content type. For example, the first data extraction model can include definitions for a plurality of data types. An OCR pass can be performed on an image to identify a plurality of characters of the image. The content type can be manually selected (e.g., via user input) or can be automatically inferred from an identifier (e.g., a logo or pattern of characters). For example, in some implementations, an identifier associated with a second content type can be detected in the image. A rule change can then be applied for the first data extraction model based on the identifier associated with the second content type. For example, after detecting that the image is associated with a second content type (different from the first content type), at least one data element profile can be added or applied for the model. Examples of rules that can be changed include, but are not limited to, visibility (e.g., is the field visible to end-users), whether or not the system will require that data be entered into a field, the presence or absence of particular data types and/or whether or not a data type is used to perform extraction.

Example Implementations

FIG. 1 illustrates an embodiment of an OCR system 100. The OCR system includes a controller 106 configured to carry out various functionalities, operations, or processing blocks of the OCR system 100 that are described herein. For example, the controller 106 includes at least one processor 108 configured to execute one or more software modules (e.g., OCR modules 112) stored in a memory 110. In implementations, the OCR modules 112, when executed, are configured to cause the controller 106 to perform one or more of the processes illustrated in FIGS. 2 through 6D, which are further described herein. The terms "controller," "functionality," "service," and "logic" as used herein generally represent software, firmware, hardware, or a combination of software, firmware, or hardware in conjunction with controlling the OCR system 100. In the case of a software implementation, the module, functionality, or logic represents program code (e.g., algorithms embodied in a non-transitory computer readable medium) that performs specified tasks when executed on a processor (e.g., central processing unit (CPU) or CPUs). The program code can be stored in one or more non-transitory computer-readable memory devices or media (e.g., internal memory and/or one or more tangible media), and so on. For example, memory may include but is not limited to volatile memory, non-volatile memory, Flash memory, SRAM, DRAM, RAM and ROM. The structures, functions, approaches, and techniques described herein can be implemented on a variety of commercial computing platforms having a variety of processors.

As shown in FIG. 1, the controller 106 includes processor 108, memory 110, and a communication interface 114. The processor 108 provides processing functionality for at least the controller 106 and can include any number of processors, micro-controllers, circuitry, field programmable gate array (FPGA) or other processing systems, and resident or external memory for storing data, executable code, and other information accessed or generated by the controller 106. The processor 108 can execute one or more software programs (e.g., OCR modules 112) embodied in a non-transitory computer readable medium (e.g., memory 110) that implement techniques described herein. The processor 108 is not limited by the materials from which it is formed or the processing mechanisms employed therein and, as such, can be implemented via semiconductor(s) and/or transistors (e.g., using electronic integrated circuit (IC) components), and so forth.

The memory 110 can be an example of tangible, computer-readable storage medium that provides storage functionality to store various data and or program code associated with operation of the controller 106, such as software programs and/or code segments, or other data to instruct the processor 108, and possibly other components of the OCR system 100/controller 106, to perform the functionality described herein. Thus, the memory 110 can store data, such as a program of instructions (e.g., OCR modules 112) for operating the OCR system 100 (including its components), and so forth. It should be noted that while a single memory 110 is described, a wide variety of types and combinations of memory (e.g., tangible, non-transitory memory) can be employed. The memory 110 can be integral with the processor 108, can comprise stand-alone memory, or can be a combination of both.

Some examples of the memory 110 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the OCR system 100 and/or the memory 110 can include removable integrated circuit card (ICC) memory, such as memory provided by a subscriber identity module (SIM) card, a universal subscriber identity module (USIM) card, a universal integrated circuit card (UICC), and so on.

The controller 106 may include a communication interface 114. The communication interface 114 can be operatively configured to communicate with components of the OCR system 100. For example, the communication interface 114 can be configured to transmit data for storage in the OCR system 100, retrieve data from storage in the OCR system 100, and so forth. The communication interface 114 can also be communicatively coupled with the processor 108 to facilitate data transfer between components of the OCR system 100 and the processor 108 (e.g., for communicating inputs to the processor 108 received from a device (e.g., imaging device 102) communicatively coupled with the OCR system 100/controller 106). It should be noted that while the communication interface 114 is described as a component of controller 106, one or more components of the communication interface 114 can be implemented as external components communicatively coupled to the OCR system 100 via a wired and/or wireless connection. The OCR system 100 can also include and/or connect to one or more input/output (I/O) devices (e.g., via the communication interface 114), such as a display, a mouse, a touchpad, a touchscreen, a keyboard, a microphone (e.g., for voice commands), imaging device 102, and so on.

In embodiments, the OCR modules 112 comprise one or more OCR engines that cause the processor 108 to perform OCR analysis on an image when an OCR engine is executed/run by the processor 108. The OCR modules 112 can also include one or more modules that cause the processor 108 to perform iterative OCR, cell-based OCR, segment-based OCR, or combinations thereof when the OCR modules 112 are executed/run by the processor 108. The controller 106 can be configured to perform one or more OCR processes on an image (e.g., scan, picture, screenshot). The image may be generated by the controller 106 (e.g., a screenshot) or received from an imaging device (e.g., a scanner or camera), a controller/computing system, an external memory device (e.g., flash drive, SD card, external HDD or SSD, etc.), remote server, cloud storage, or the like. In an embodiment, the controller 106 may be communicatively coupled (e.g., by wired, wireless, and/or network connection) to an imaging device 102 (e.g., a scanner or camera) that is configured to generate an image of a scanned or photographed document 104, or multiple documents 104 (e.g., several pages/documents scanned through a feeder).

FIGS. 2 through 6D illustrate example processes 200 that employ an OCR system, such as the OCR system 100 illustrated in FIG. 1, for OCR analysis, document classification, and/or data extraction. For example, the controller 106/processor 108 can execute OCR modules 112 from memory 110 that cause the controller 106/processor 108 to perform process 200, process 300, process 400, process 500, and/or process 600. In general, operations of disclosed processes (e.g., process 200, process 300, process 400, process 500, and/or process 600) may be performed in an arbitrary order, unless otherwise provided in the claims.

Figure 2:
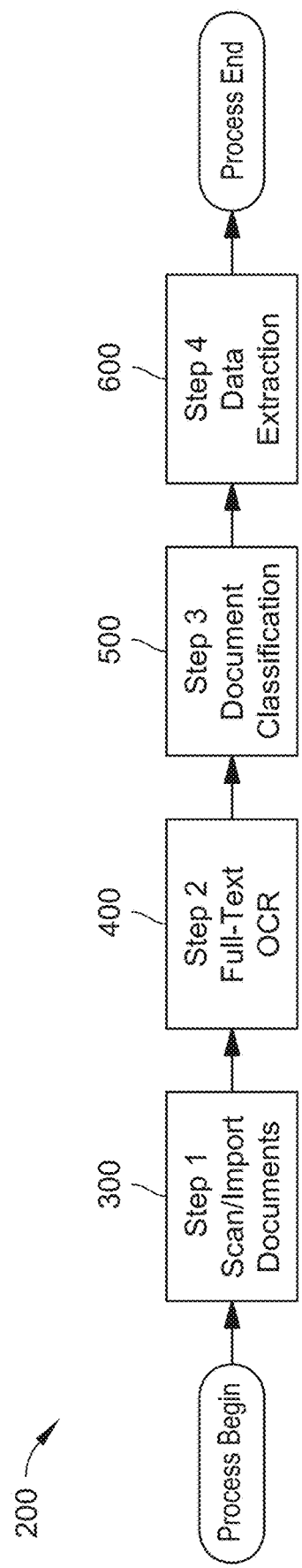
FIG. 2 is a flow diagram illustrating a process that employs an OCR system, such as the system illustrated in FIG. 1, for OCR analysis, document classification, and data extraction, in accordance with an example implementation of the present disclosure.

As shown in FIG. 2, a process (e.g., process 200) can include one or more processes/sub-processes. For example, process 200 can include: scanning/importing documents (process 300); performing OCR on scanned/imported documents (process 400); classifying scanned/imported documents (process 500); and/or extracting data (e.g., extracting text/information) from scanned/imported documents (process 600). It is noted, however, that one or more of the processes/sub-processes (e.g., process 300, process 400, process 500, and/or process 600) can be performed individually, or in any combination.

Figure 3:
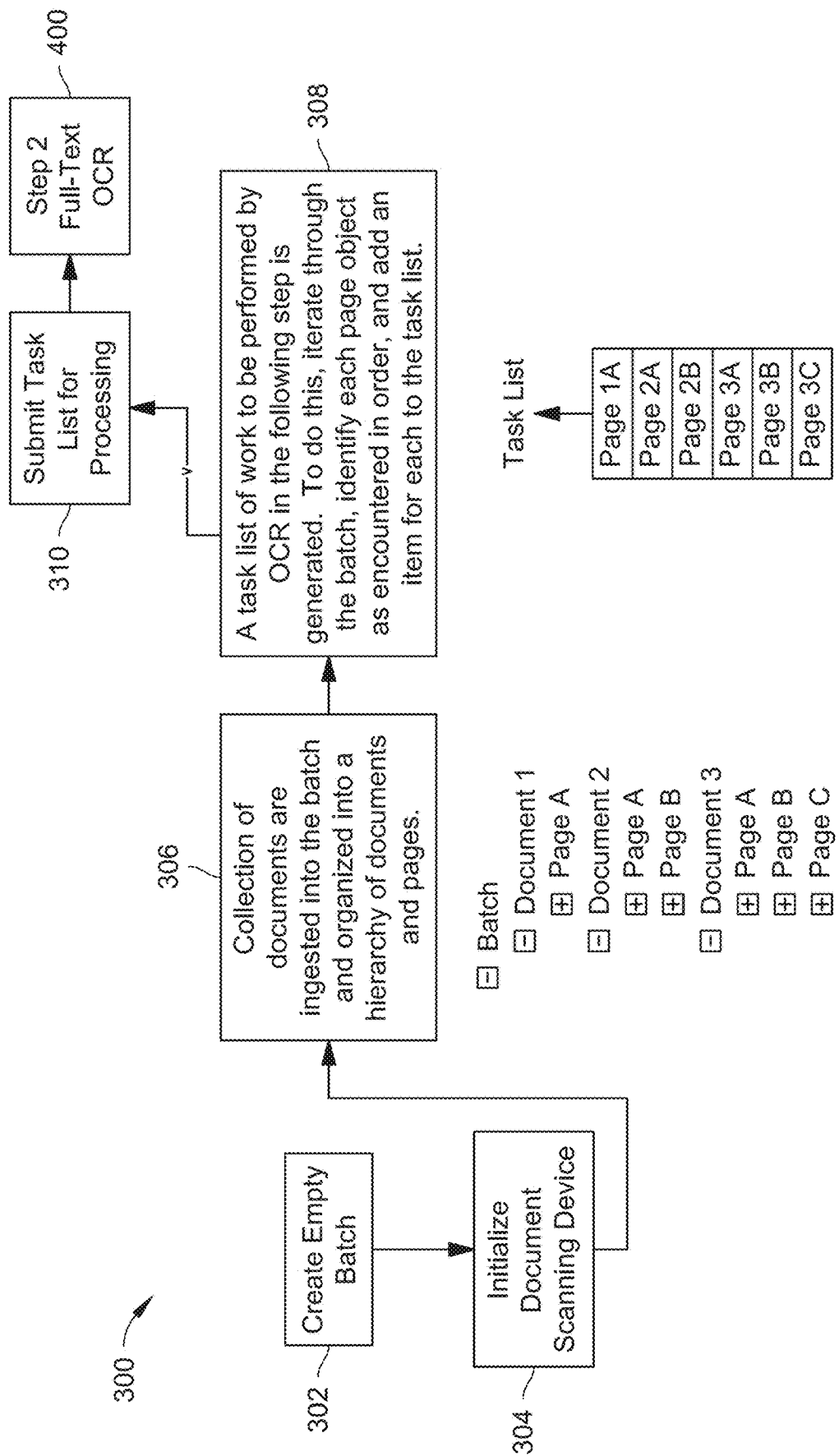
FIG. 3 is a flow diagram illustrating a process that employs an OCR system, such as the system illustrated in FIG. 1, to scan or import documents for OCR analysis, document classification, and data extraction, in accordance with an example implementation of the present disclosure.

FIG. 3 illustrates a process 300 for scanning or importing documents for OCR analysis, document classification, and/or data extraction, in accordance with an example implementation of the present disclosure. An empty batch is first created (block 302). For example, the controller 106 can be configured to generate (e.g., open) a batch file for OCR processing. Documents/images are then scanned or imported, and the scanned or imported documents/images are saved to memory (e.g., memory 110, or another memory communicatively coupled to controller 106) (block 304). For example, the controller 106 can be configured to receive documents/images (e.g., documents 104) from an imaging device, from memory, and/or from another device, server, or the like. The scanned or imported documents/images are then organized into a hierarchy of documents and pages (e.g., document 1 with page A, document 2 with pages A and B, document 3 with pages A, B, and C, and so on) in the batch for OCR processing (block 306). For example, the controller can be configured to store the documents/images in the batch file with information regarding the number of pages in each document/image. A task list for the batch is then generated based on the pages encountered in each document (block 308). For example, the controller 106 can be configured to generate a task list including a listing of each page with an identifier that indicates the document and page number/reference character (e.g., page 1A, page 2A, page 2B, page 3A, page 3B, page 3C, and so on). The task list is then submitted for processing (block 310). For example, the controller 106 can be configured to proceed to performing OCR analysis (process 400) on the documents/images based on the task list.

FIGS. 4A through 4G illustrate a process 400 for performing OCR analysis on one or more documents, in accordance with an example implementation of the present disclosure. The controller 106 can be configured to load preconfigured OCR settings (block 401). For example, the controller 106 can be configured to run an OCR engine defined by the OCR modules 112 executed by the controller 106/processor 108. The controller 106 may load a task list, such as the task list generated at the end of process 300 (block 402). The controller 106 may begin to process each item (e.g., document/image, or page of a document) in the task list (block 403). For example, the controller 106 can be configured to determine if any items are available in the task list (e.g., items that are waiting to be processed) (block 404).

For each item, the controller 106 is configured to perform OCR on an image (e.g., an image/document from memory, or an image of a document, such as document 104) (block 407). In an embodiment, the controller 106 performs an OCR pass on an image by carrying the following operations. The controller 106 is configured to analyze each horizontal row of pixels making up the image, counting the number of black vs. white pixels. Based on this analysis, the controller 106 is configured to determine where a line of text appears to exist on the image. The controller 106 then analyzes each line of text by counting the number of black vs. white pixels on each vertical column of pixels in a respective line of text. The controller 106 is configured to determine where respective characters in each line of text start and stop based on the whitespace between characters. The controller 106 is configured to define a character area (e.g., a rectangular area) having a width and a height for each character detected in a row. The controller 106 can then analyze each resulting character area to identify the character in the character area. For example, the controller 106 can be configured to compare a character image defined by pixels in a respective character area with a database of characters to determine what character matches the character image. In this manner, the controller 106 can identify characters in the image. The controller 106 can also be configured to determine the font, font size, and the x-y coordinates of the character. The controller 106 may be configured to generate a master OCR results file including each identified character, a character confidence level associated with each identified character, a location (e.g., x-y coordinate) for each identified character, and a size (e.g., font size) of each identified character (block 408)

Figure 4A:
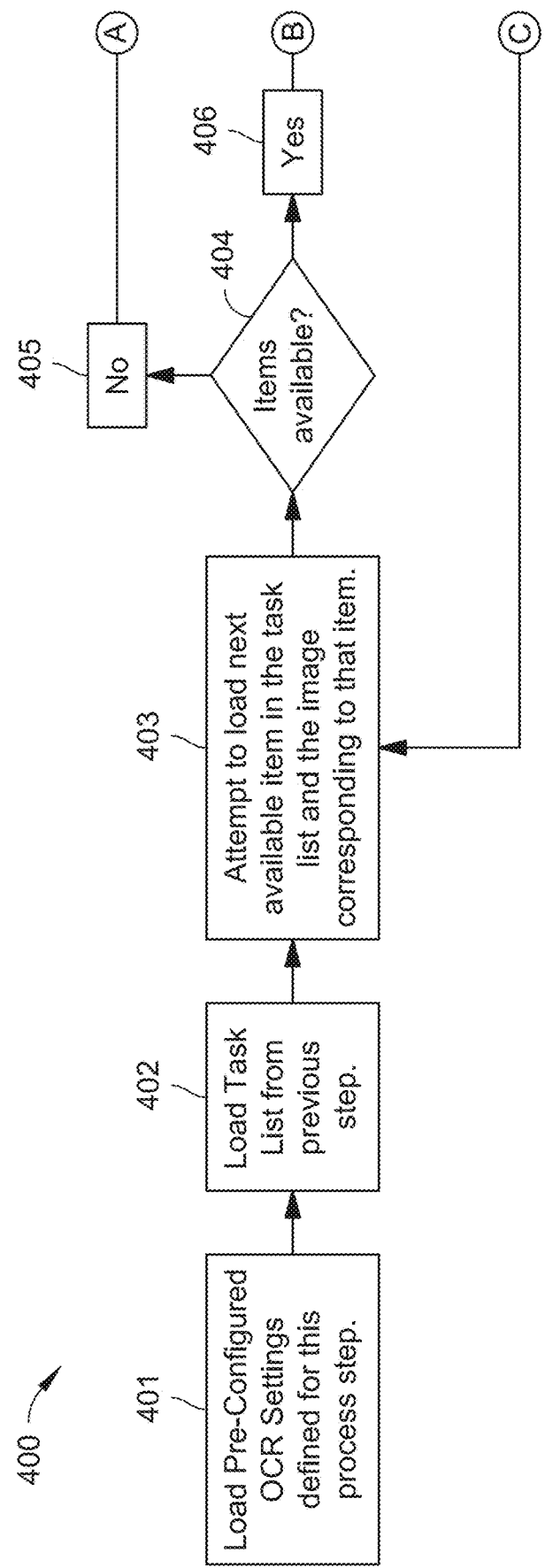
FIG. 4A is a flow diagram illustrating part of a process that employs an OCR system, such as the system illustrated in FIG. 1, to perform OCR analysis on one or more documents, in accordance with an example implementation of the present disclosure.
Figure 4B:
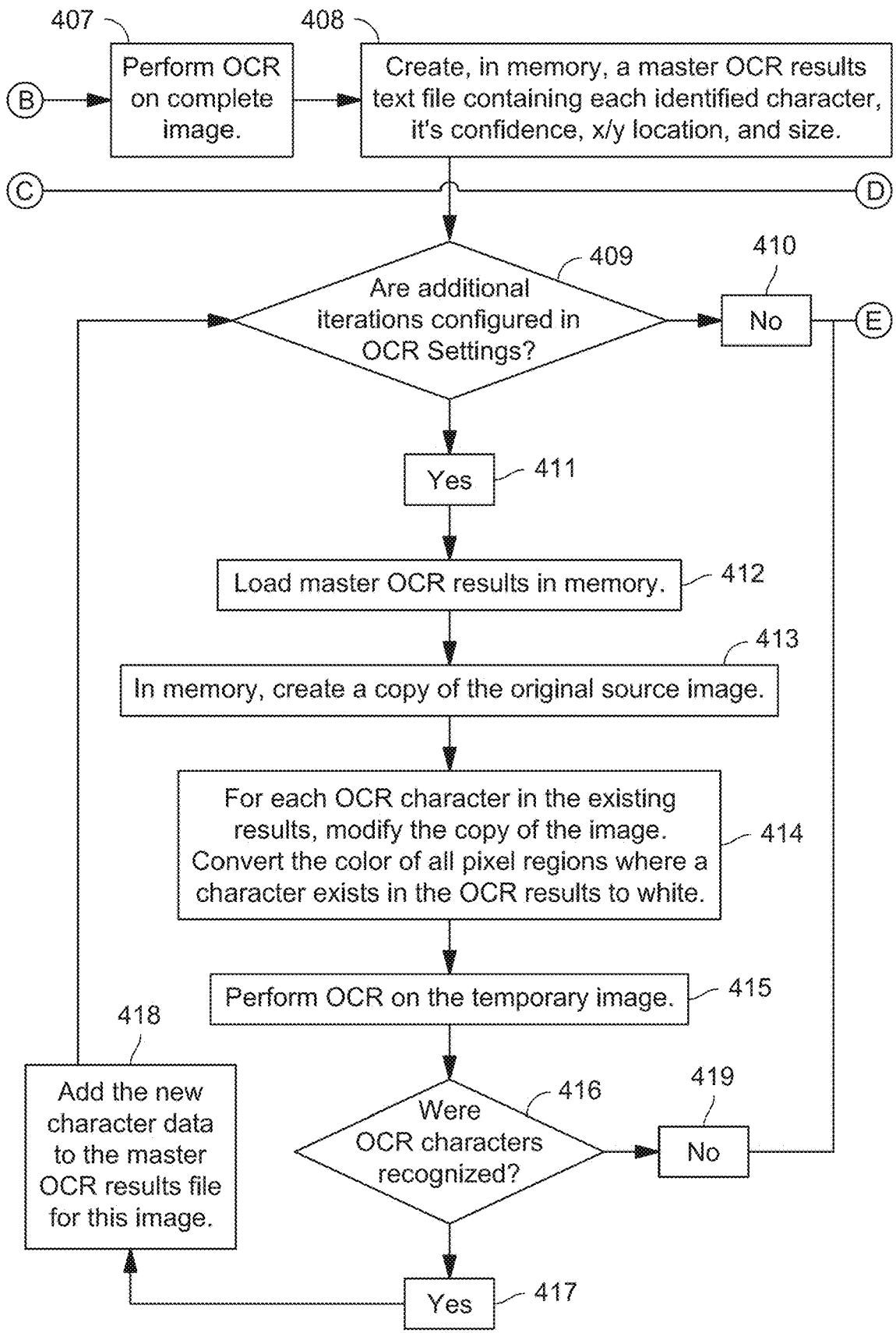
FIG. 4B is a flow diagram illustrating part of a process that employs an OCR system, such as the system illustrated in FIG. 1, to perform OCR analysis on one or more documents, in accordance with an example implementation of the present disclosure.

In implementations, the controller 106 is further configured to perform one or more of the OCR processes (iterative OCR, cell-based OCR, and segment-based OCR) described herein with reference to FIGS. 4B through 4F. For example, as shown in FIG. 4B, the controller 106 may be configured to perform several OCR iterations (block 409). If iterative OCR processing is not enabled (block 410) or unsuccessful (block 419), the controller 106 may be configured to terminate OCR analysis or perform cell-based OCR and/or segment based OCR to achieve improved identifications of one or more characters. If iterative OCR processing is enabled (block 411), the controller 106 is configured to load master OCR results in memory at the start/end of each iteration (block 412). The controller 106 is then configured to generate a copy of the image for another (next) OCR pass/iteration (block 413). The controller 106 may be configured to store the copy of the image to temporary memory (e.g., RAM) or to a static memory (e.g., HDD, flash memory, SDD, or the like). For each recognized OCR character (e.g., each character having a character confidence level that is at least the threshold character confidence level), the controller 106 is configured to modify the copy of the image by removing a respective portion of the image corresponding to the recognized character (block 414). For example, the controller 106 can be configured to convert the color of all pixel regions where a recognized character exists in the OCR results to white. The controller 106 is configured to perform an OCR pass/iteration on the modified copy of the image to identify (or attempt to identify) all other characters (e.g., characters that had character confidence levels below the threshold character confidence level) another time (block 415).

In an example implementation, the controller may perform an OCR pass on an image to identify a plurality of characters of the image, where the controller identifies a first character located in a first portion of the image, wherein an identification of the first character is associated with a first character confidence level that is at least a threshold character confidence level (i.e., the first character is recognized), and the controller identifies a second character located in a second portion of the image, wherein a first identification of the second character is associated with a second character confidence level that is below the threshold character confidence level (i.e., the second character is not recognized). In such a case, the controller may perform an additional OCR pass on the second portion of the image to identify the second character a second time, wherein a second identification of the second character is associated with a third character confidence level. The controller 106 may be configured to select the first identification of the second character or the second identification of the second character based upon a comparison of the second character confidence level and the third character confidence level.

The controller 106 may be configured to determine whether a character was recognized in second/subsequent identification of a character (e.g., with a character confidence level at or above the threshold level), or whether the character confidence level improved from previous OCR passes/iterations (block 416). If there was an improvement and/or successfully character recognition (block 417), the controller 106 is configured to update the master OCR results list by adding the identified character or replacing a previous entry with the identified character from the latest OCR pass/iteration (block 418). The process 400 can repeat blocks 409 through 418 until all characters are successfully recognized or until a predetermined (e.g., pre-programmed or user-defined) number of OCR iterations/passes have been performed.

In implementations, the number of iterations may be predefined (e.g., pre-programmed) or manually selected (e.g., set via user input). After the iterations are performed, the controller 106 is configured to synthesize the text (e.g., the identified characters) together as a single result containing identified characters from each iteration, wherein an identification for a character that is identified in multiple iterations (e.g., at the same location (x-y coordinates) of the image) may be selected based upon a comparison of respective confidence levels associated with the different OCR iterations. In this regard, the controller 106 can be configured to select the first identification of the second character or the second identification of the second character based upon a comparison of the second confidence level and the third confidence level. For example, the identification associated with the highest confidence level can be selected and used to synthesize the resulting text. In some implementations, after all OCR iterations are performed, the master OCR list includes a list of characters having identifications that met the character confidence threshold from each OCR pass, the exact size and X, Y coordinate (location) of each character, and the character confidence level/score generated by the OCR engine. The controller 106 may be configured to determine if there are characters identified by different iterations that are overlapping. If an overlap is found, the controller 106 can be configured to retain whichever character had the highest confidence of all iterations and discard the other overlapping character identifications.

Figure 4C:
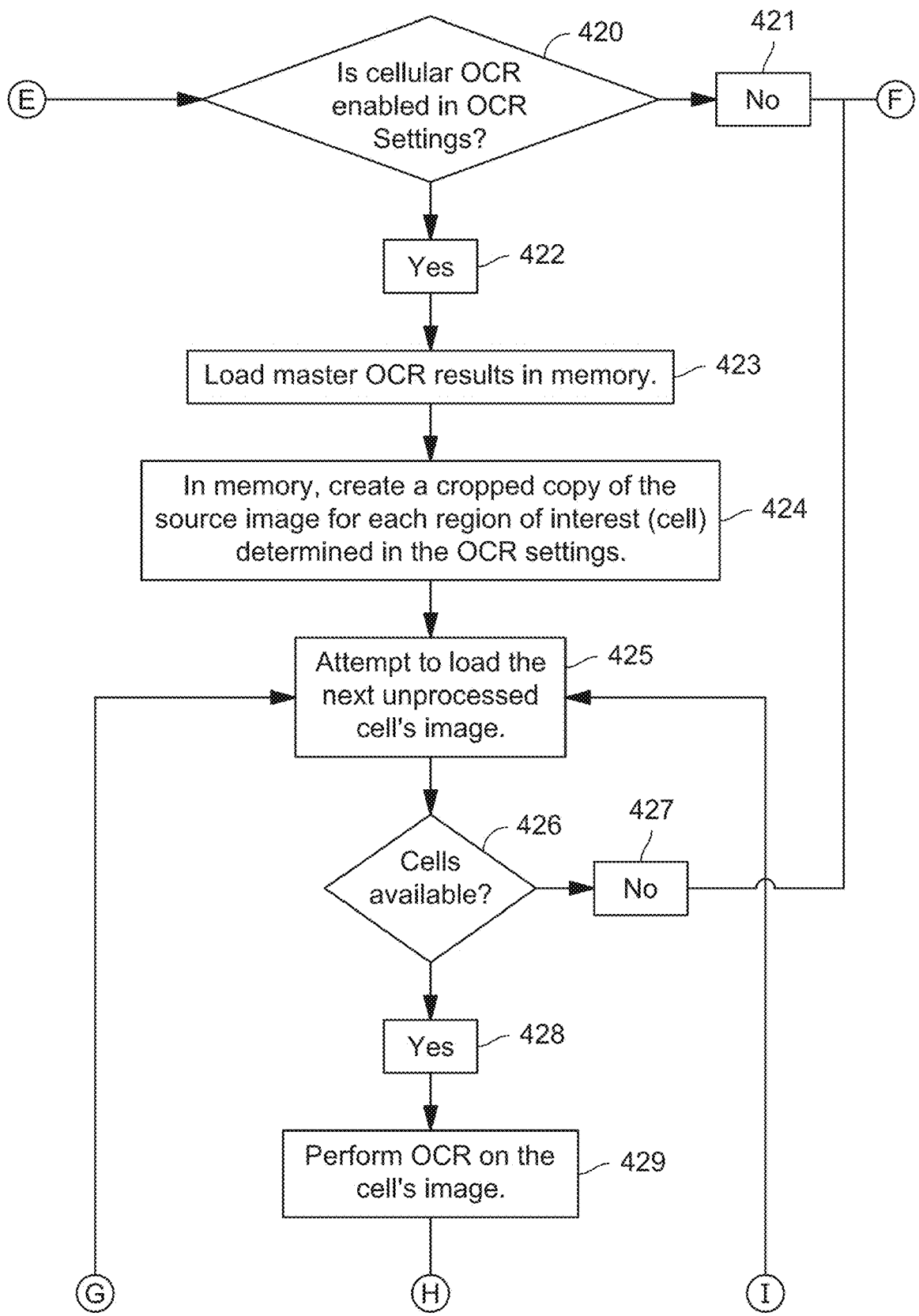
FIG. 4C is a flow diagram illustrating part of a process that employs an OCR system, such as the system illustrated in FIG. 1, to perform OCR analysis on one or more documents, in accordance with an example implementation of the present disclosure.
Figure 4D:
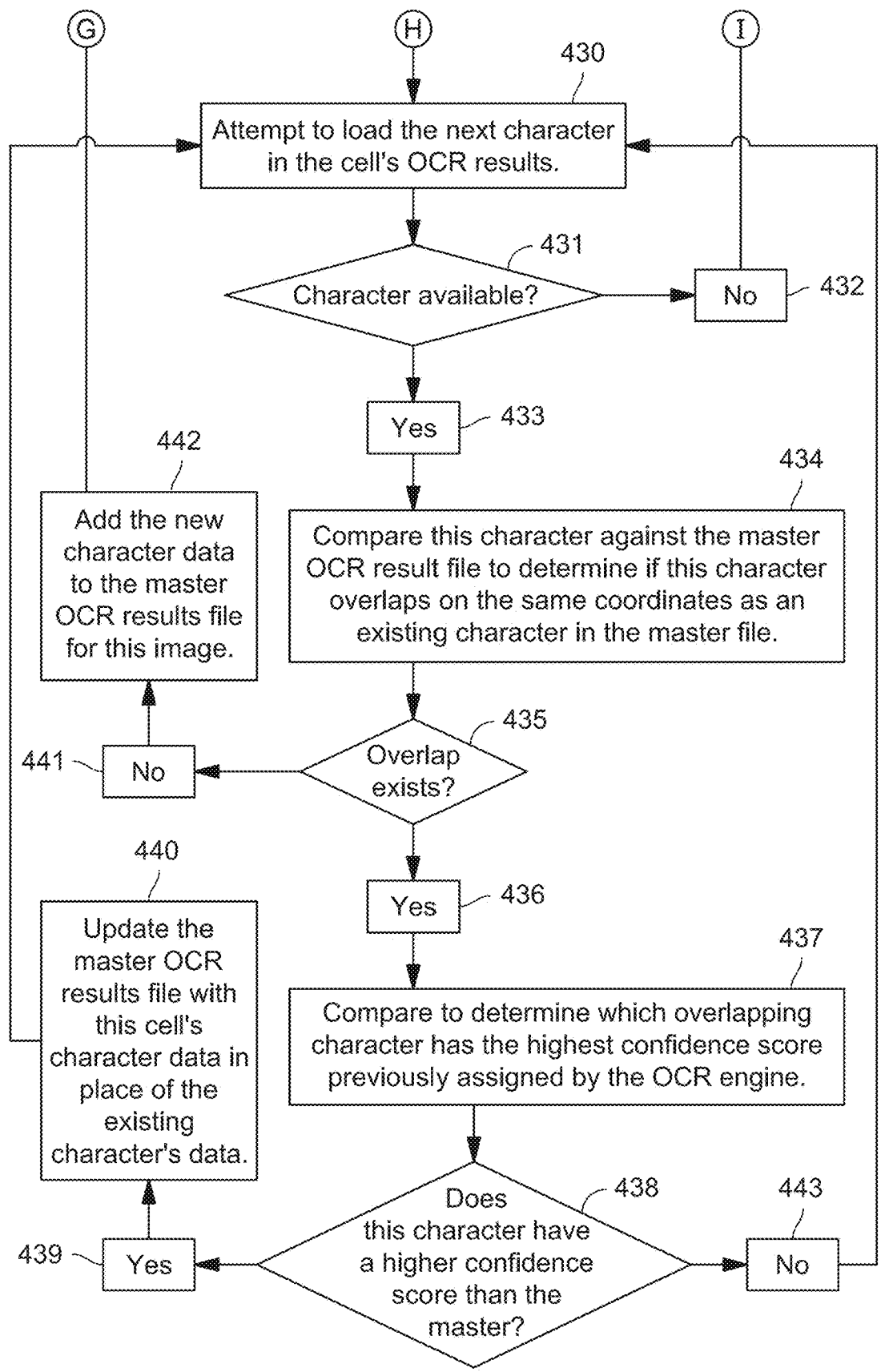
FIG. 4D is a flow diagram illustrating part of a process that employs an OCR system, such as the system illustrated in FIG. 1, to perform OCR analysis on one or more documents, in accordance with an example implementation of the present disclosure.

As shown in FIGS. 4C and 4D, in implementations, the controller 106 may be configured to perform section/cell-based OCR analysis on one or more documents/images (block 420). If cell-based OCR processing is not enabled (block 421) or OCR analysis has been performed on all of the cells/sections (block 427), the controller 106 may be configured to terminate processing or perform segment based OCR to achieve improved identifications of one or more characters. If cell-based OCR processing is enabled (block 422), the controller 106 is configured to load master OCR results in memory (block 423). The controller 106 is then configured to generate a cropped copy of the image for region of interest (e.g., each section/cell) of the image (block 424). The controller 106 is then configured to process the sections/cells, one at a time. For example, the controller 106 can attempt to load an unprocessed section/cell (block 425). When the controller 106 determines that an unprocessed section/cell is available for OCR analysis (blocks 426 and 428), the controller performs OCR analysis on the cropped copy of the image that is associated with that section/cell (block 429). After performing the OCR analysis for a section/cell, the controller 106 attempts to load each identified character in the OCR results list for the section/cell (block 430). If there are no more identified characters (blocks 431 and 432), the controller 106 is configured to process the next section/cell (block 425). If there are identified characters (blocks 431 and 433), the controller 106 is configured to compare the identified character against the master OCR results list to determine if the identified character has overlapping coordinates with a previously recognized character in the master OCR results list (block 434). When there is no overlap (blocks 435 and 441), the controller is configured to add the identified character to the master OCR list for the image/document being analyzed (block 442). When there is an overlap between the identified character and a previously recognized character in the master OCR results list (blocks 435 and 436), the controller 106 is configured to compare the identified character and the previously recognized character to determine which of the two has the highest character confidence level (block 437). If the previously recognized character has a higher character confidence level than the identified character (blocks 438 and 443), the master OCR results list remains unchanged, and the controller 106 performs the same analysis on the next identified character (if available) (block 430). If the identified character has a higher character confidence level than the identified character (blocks 438 and 439), the controller 106 is configured to update the master OCR results list by replacing the information corresponding to the previously recognized character with the information corresponding to the identified character (block 442). The controller 106 performs the same analysis on the next identified character (if available) (block 430), until all characters for the section/cell have been identified (e.g., block 432), and then the controller 106 processes the next section/cell, until all the sections/cells have been processed (block 427).

Figure 4E:
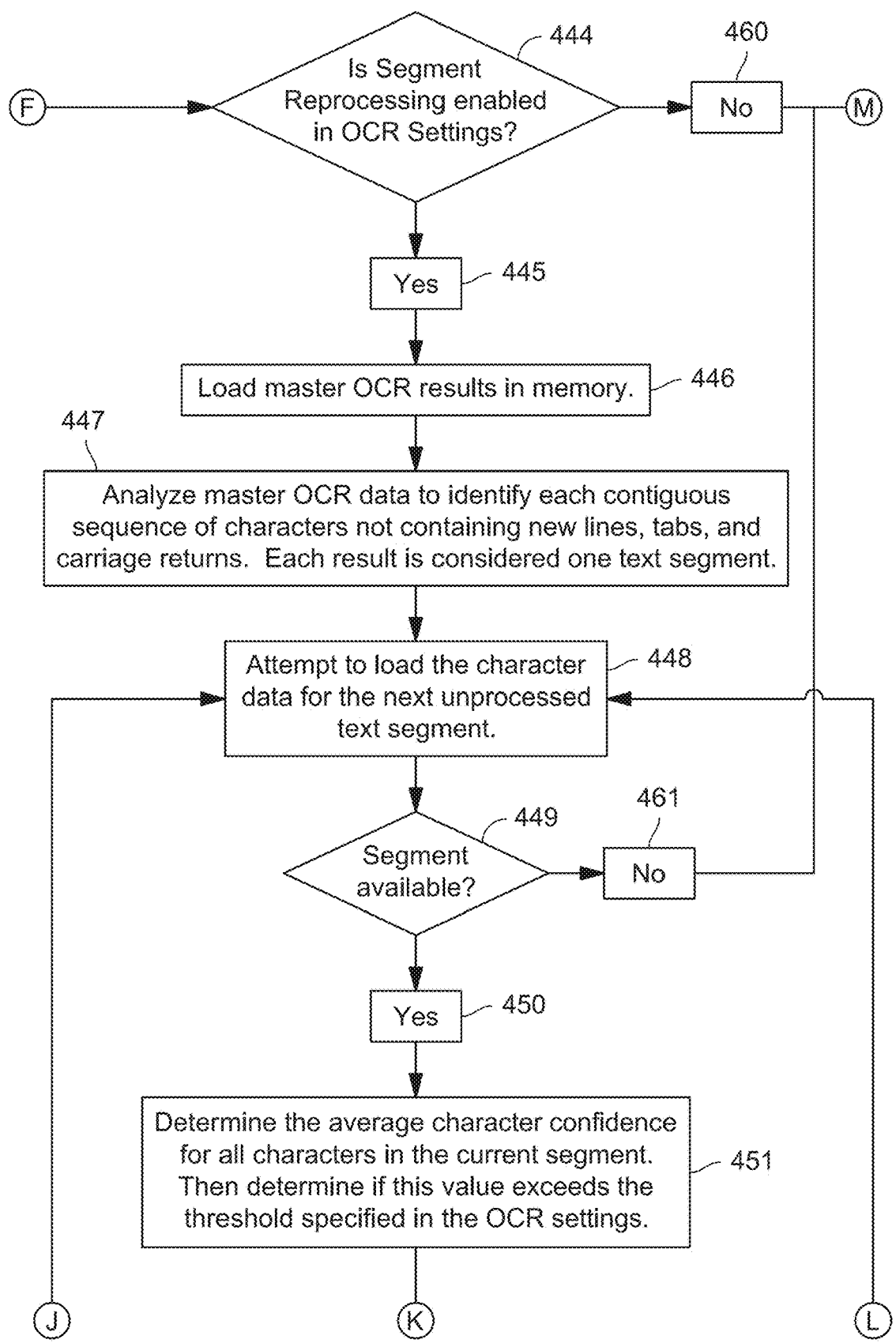
FIG. 4E is a flow diagram illustrating part of a process that employs an OCR system, such as the system illustrated in FIG. 1, to perform OCR analysis on one or more documents, in accordance with an example implementation of the present disclosure.
Figure 4F:
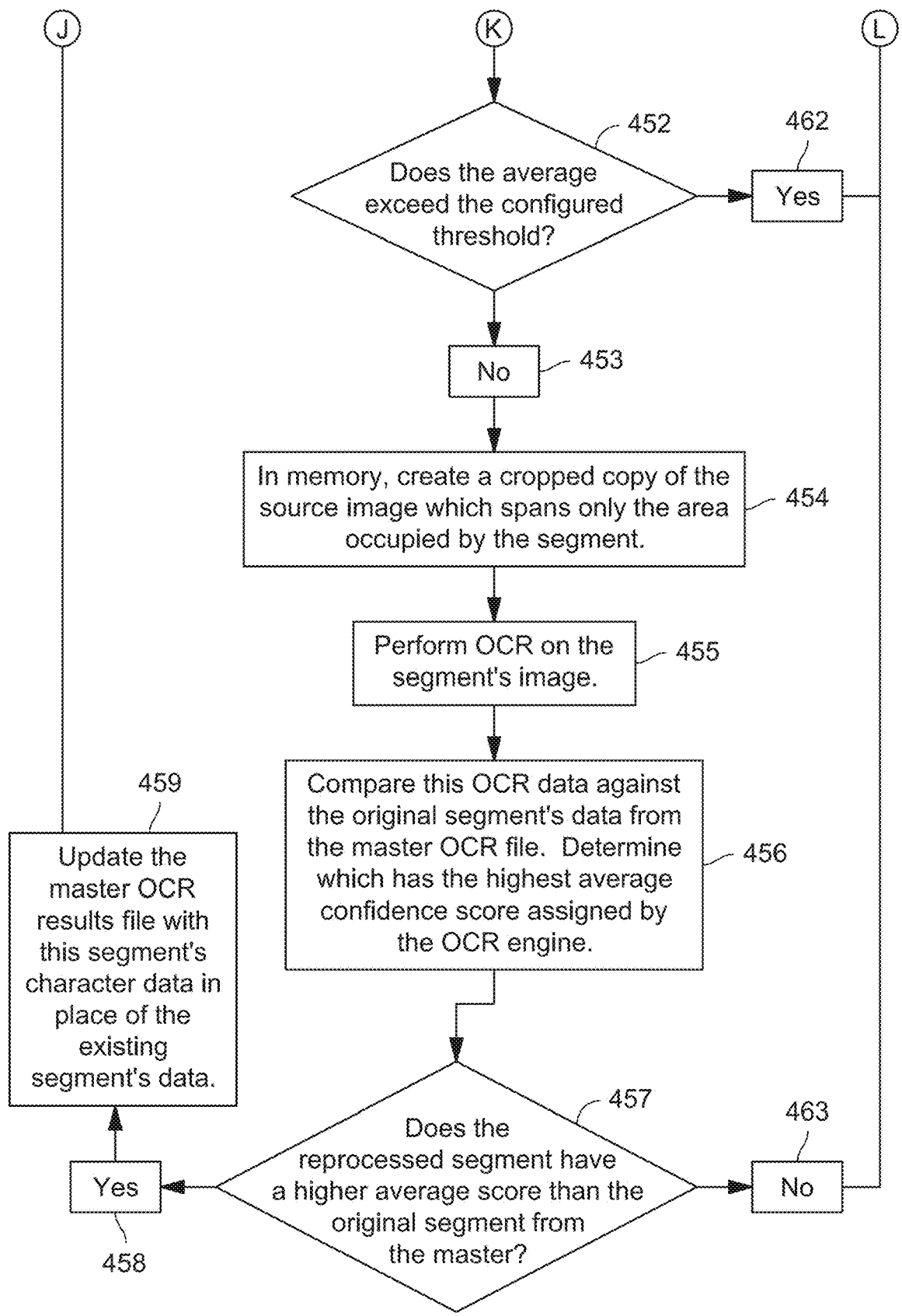
FIG. 4F is a flow diagram illustrating part of a process that employs an OCR system, such as the system illustrated in FIG. 1, to perform OCR analysis on one or more documents, in accordance with an example implementation of the present disclosure.
Figure 4G:
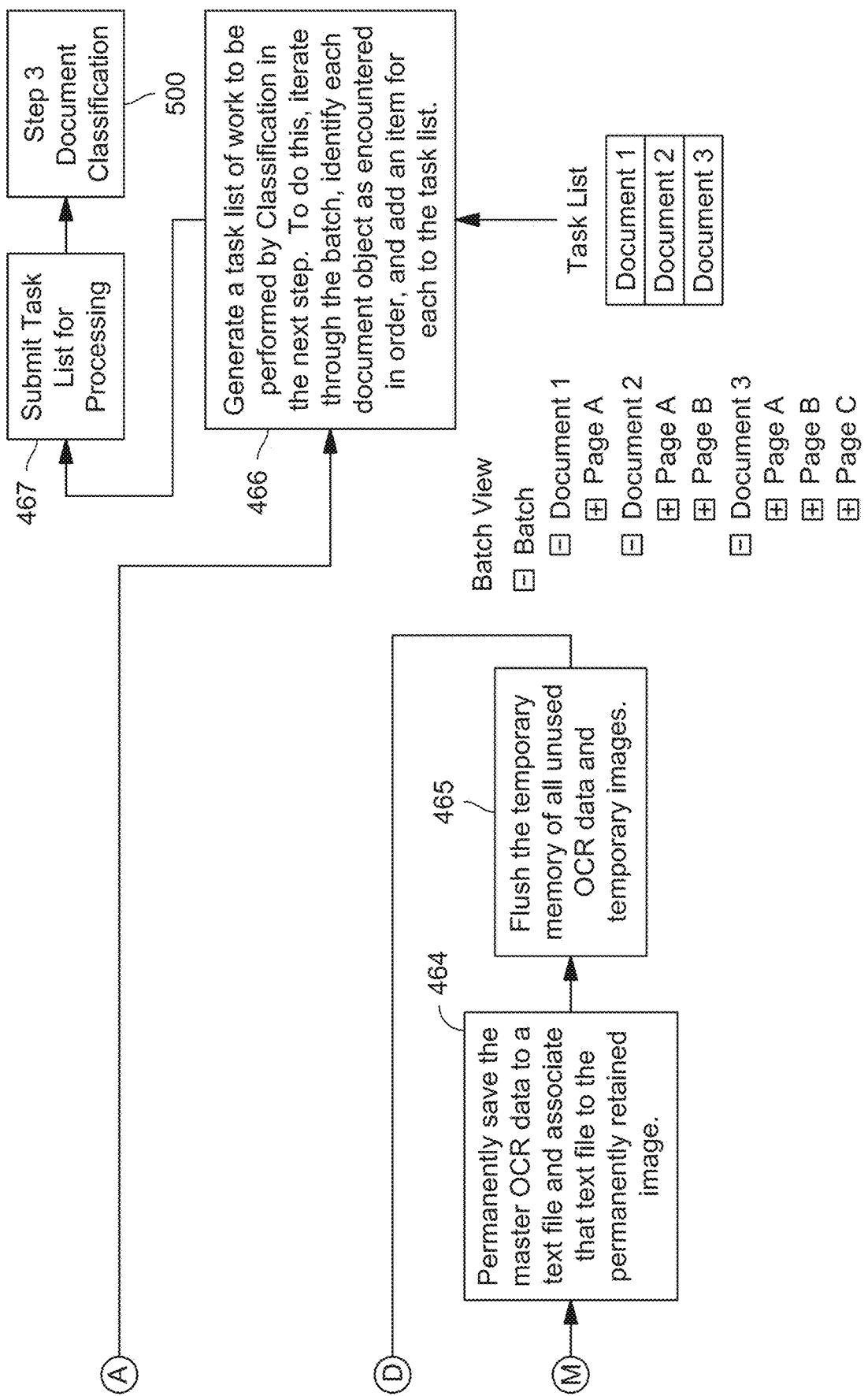
FIG. 4G is a flow diagram illustrating part of a process that employs an OCR system, such as the system illustrated in FIG. 1, to perform OCR analysis on one or more documents, in accordance with an example implementation of the present disclosure.

As shown in FIGS. 4E and 4F, in implementations, the controller 106 may be configured to perform segment-based OCR analysis on one or more documents/images (block 444). If segment-based OCR processing is not enabled (block 460) or OCR analysis has been performed on all identified segments in an image (block 461), the controller 106 may be configured to terminate processing. If segment-based OCR processing is enabled (block 445), the controller 106 is configured to load master OCR results in memory (block 446). The controller 106 is then configured to identify contiguous sequences of characters as segments of text (block 447). For example, the controller 106 can be configured to determine whether a string of characters is a segment based on whitespace between an identified character and the next. In some instances, a carriage return or a tab may indicate a beginning or end of a segment. The controller 106 is then configured to process the segments, one at a time. For example, the controller 106 can attempt to load an unprocessed segment (block 448). When the controller 106 determines that an unprocessed segment is available for OCR analysis (blocks 449 and 450), the controller 106 is configured to determine an average character confidence level for all of the characters in the segment and compare the average character confidence level for the segment with the threshold character confidence level specified in the OCR settings (block 451). If the average character confidence level for the segment exceeds the threshold character confidence level (blocks 452 and 462), the controller 106 is configured to process the next segment (block 448). If the average character confidence level for the segment is below the threshold character confidence level (blocks 452 and 453), the controller 106 is configured to generate a cropped copy of the image by removing portions of the image other than a portion of the image occupied by the segment (block 454). The controller 106 can then perform and OCR pass on the segment, isolated from the rest of the image (e.g., by performing OCR analysis on the cropped copy of the image) (block 455). The controller 106 is then configured to determine a new average character confidence level for the segment based on the OCR pass performed on the segment alone, and the controller 106 is further configured to compare the new average character confidence level with the previously determined average character confidence level for the segment (based on the full image OCR analysis) (block 456). If the previously determined average character confidence level for the segment is higher than the new average character confidence level for the segment (blocks 457 and 463), the master OCR results list remains unchanged, and the controller 106 proceeds to perform the same analysis on the next segment (block 448). If the new average character confidence level for the segment is higher than the previously determined average character confidence level for the segment (blocks 457 and 458), the controller 106 is configured to update the master OCR results list by replacing the information corresponding to the previously recognized segment of characters with the information corresponding to the new character identifications for the segment (block 459). The controller 106 performs the same analysis on the next segment (if available) (block 448), until all segments have been processed and/or updated.

After performing OCR analyses process(es) (e.g., standard OCR, iterative OCR, cell-based OCR, and/or segment-based OCR), the controller 106 is configured to save a final version of the master OCR list to memory and associate the master OCR list to the document/image that was analyzed (block 464). The controller 106 can also be configured to flush all temporary image/data files from the memory (block 465). The controller 106 may perform OCR analysis on a next item from the task list until all items (e.g., documents/images) have been analyzed (block 405). In implementations, the controller 106 may generate another task list (classification task list) for classifying each of the documents that were processed by performing OCR analysis (block 466). The controller 106 may be configured to submit/store the classification task list for use in the document classification process 500 (block 467).

Figure 5A:
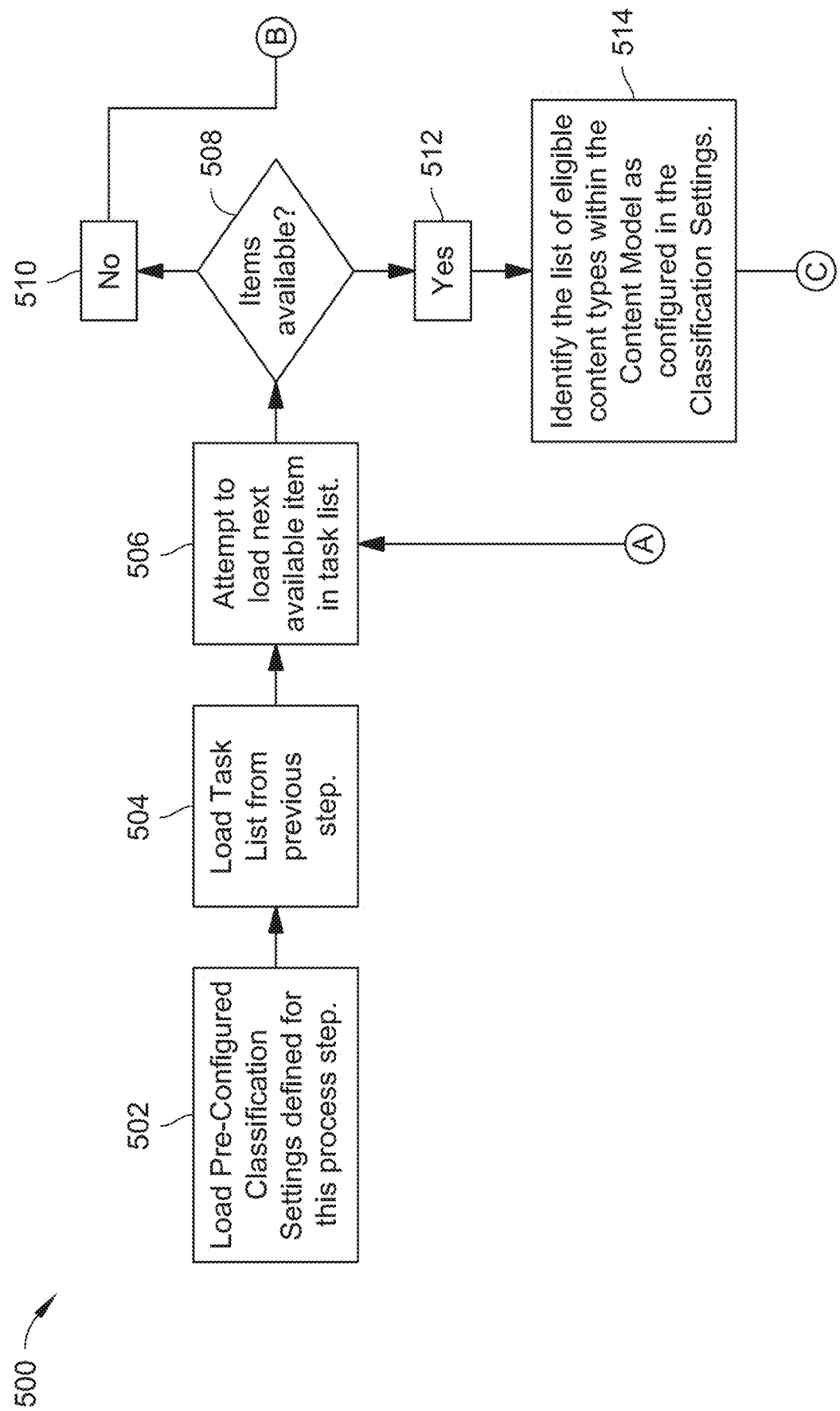
FIG. 5A is a flow diagram illustrating part of a process that employs an OCR system, such as the system illustrated in FIG. 1, to classify one or more documents for OCR-based data extraction, in accordance with an example implementation of the present disclosure.
Figure 5B:
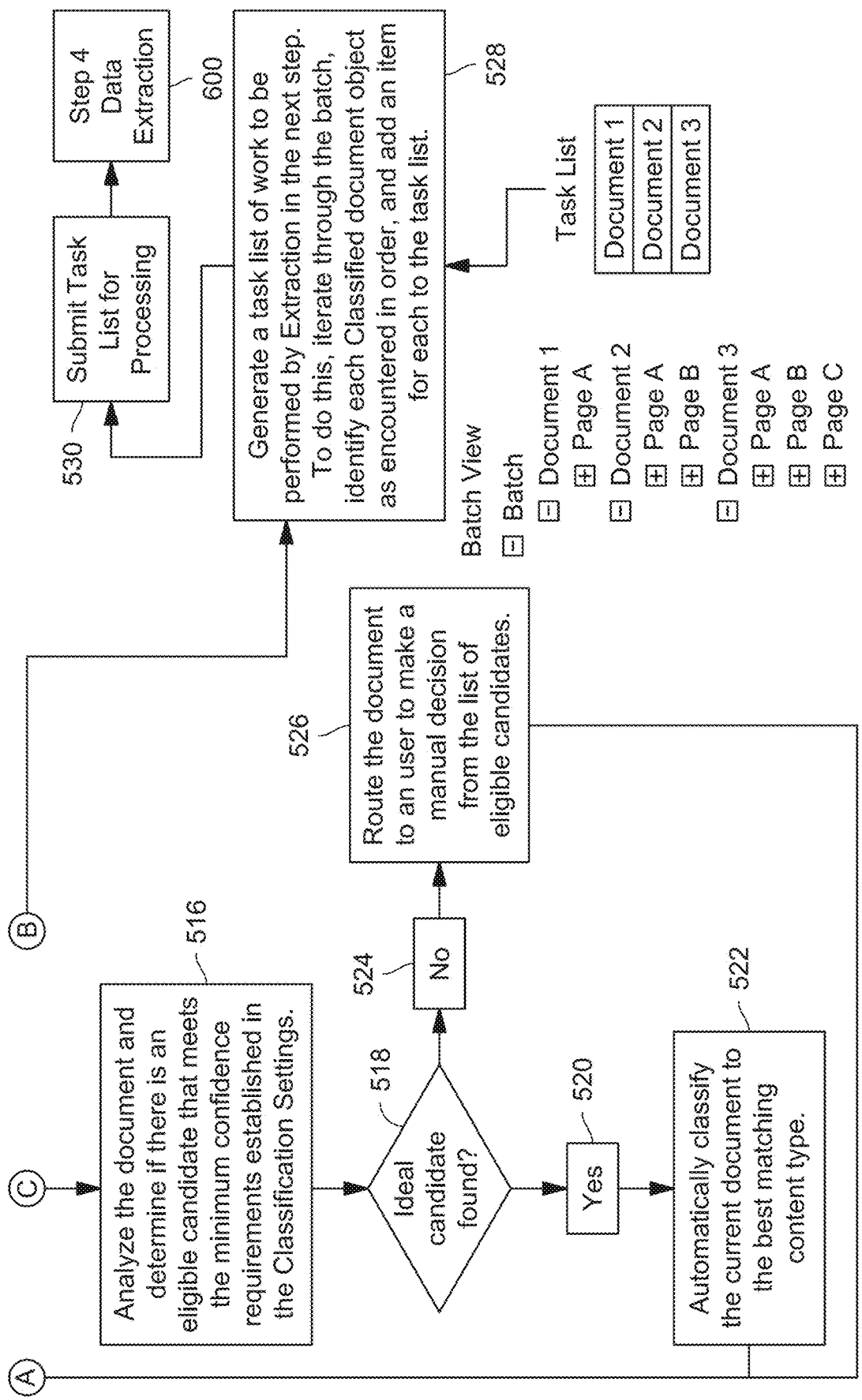
FIG. 5B is a flow diagram illustrating part of a process that employs an OCR system, such as the system illustrated in FIG. 1, to classify one or more documents for OCR-based data extraction, in accordance with an example implementation of the present disclosure.
Figure 6A:
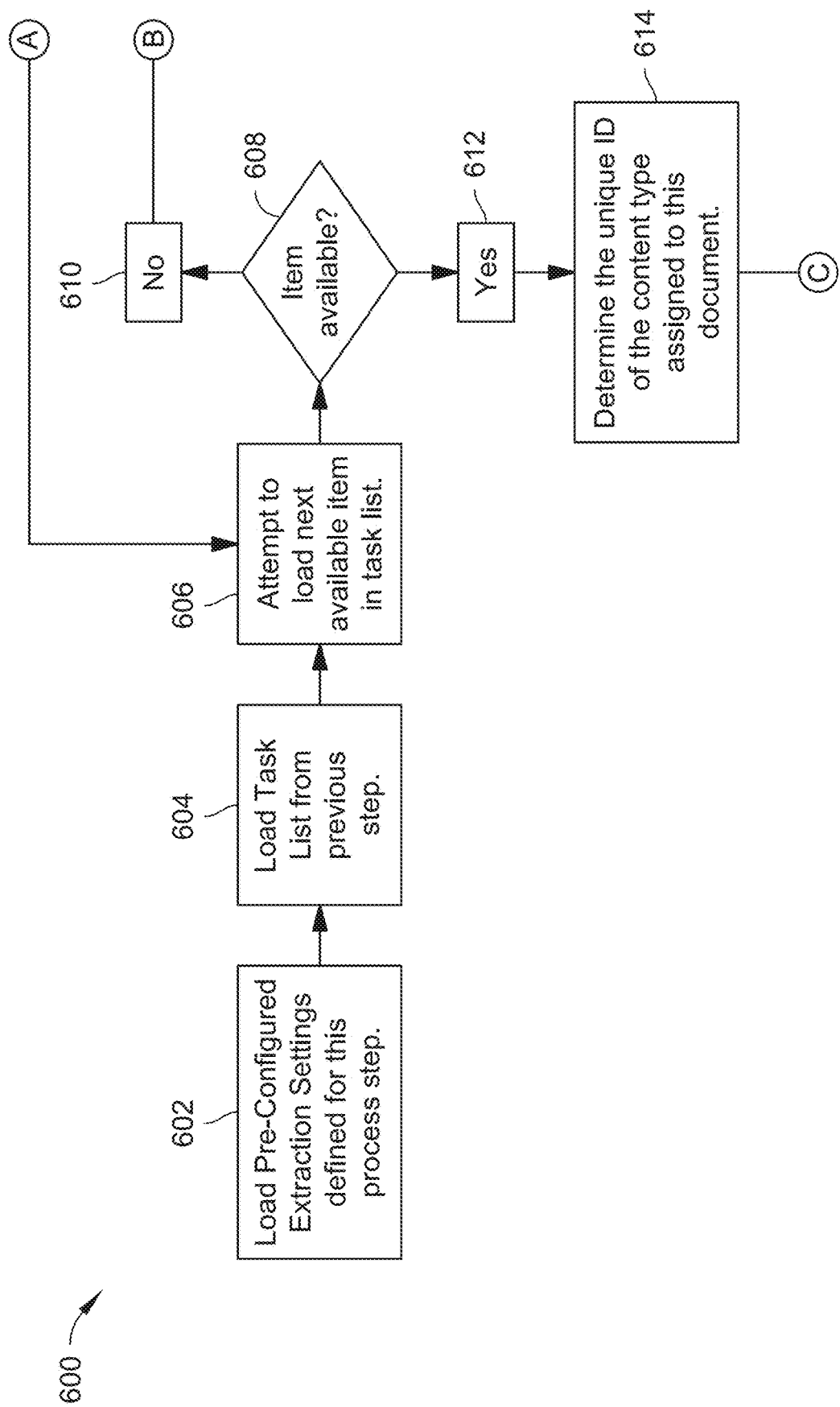
FIG. 6A is a flow diagram illustrating part of a process that employs an OCR system, such as the system illustrated in FIG. 1, to extract data from one or more documents based on respective data extraction models, in accordance with an example implementation of the present disclosure.
Figure 6B:
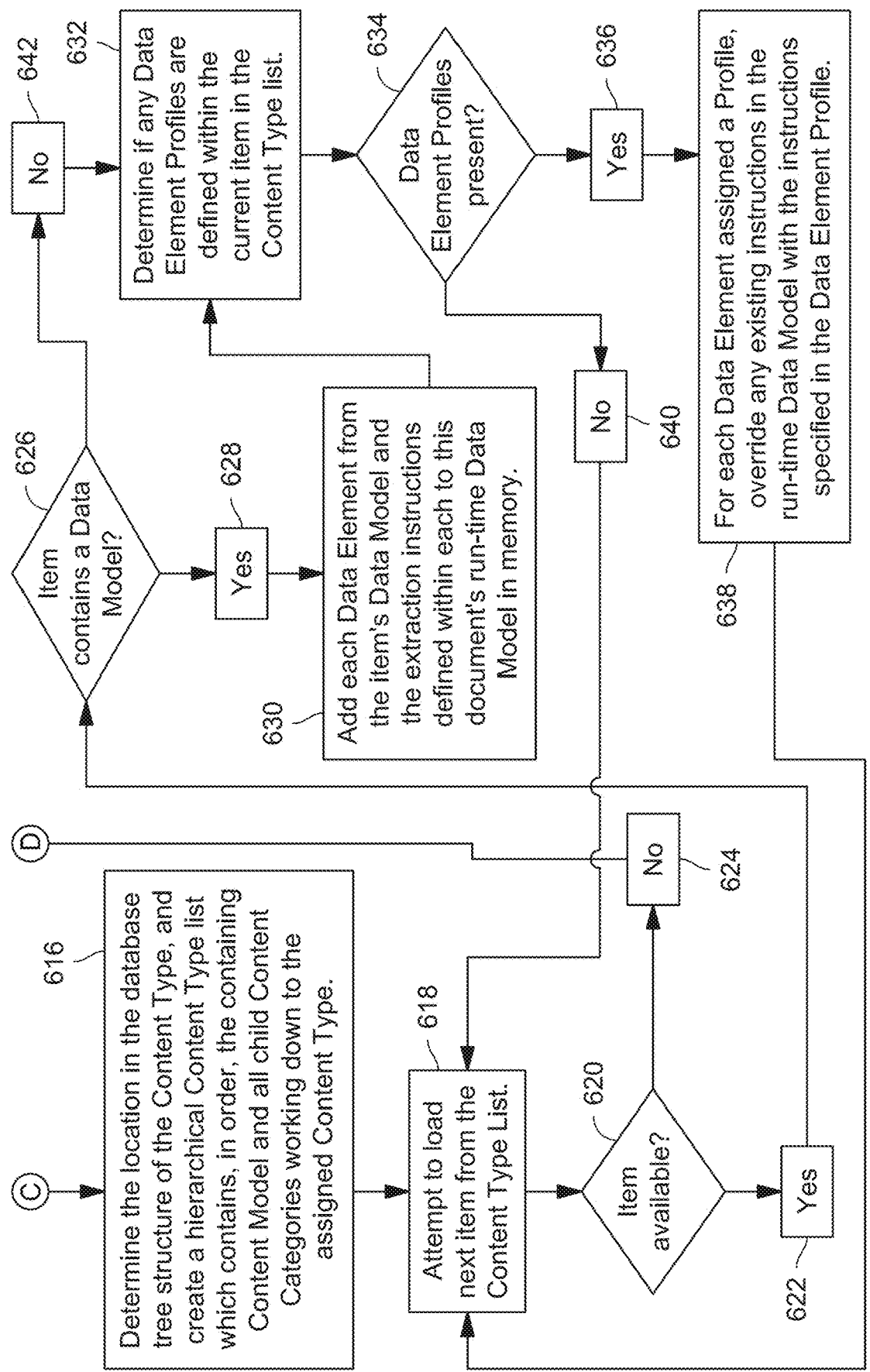
FIG. 6B is a flow diagram illustrating part of a process that employs an OCR system, such as the system illustrated in FIG. 1, to extract data from one or more documents based on respective data extraction models, in accordance with an example implementation of the present disclosure.
Figure 6C:
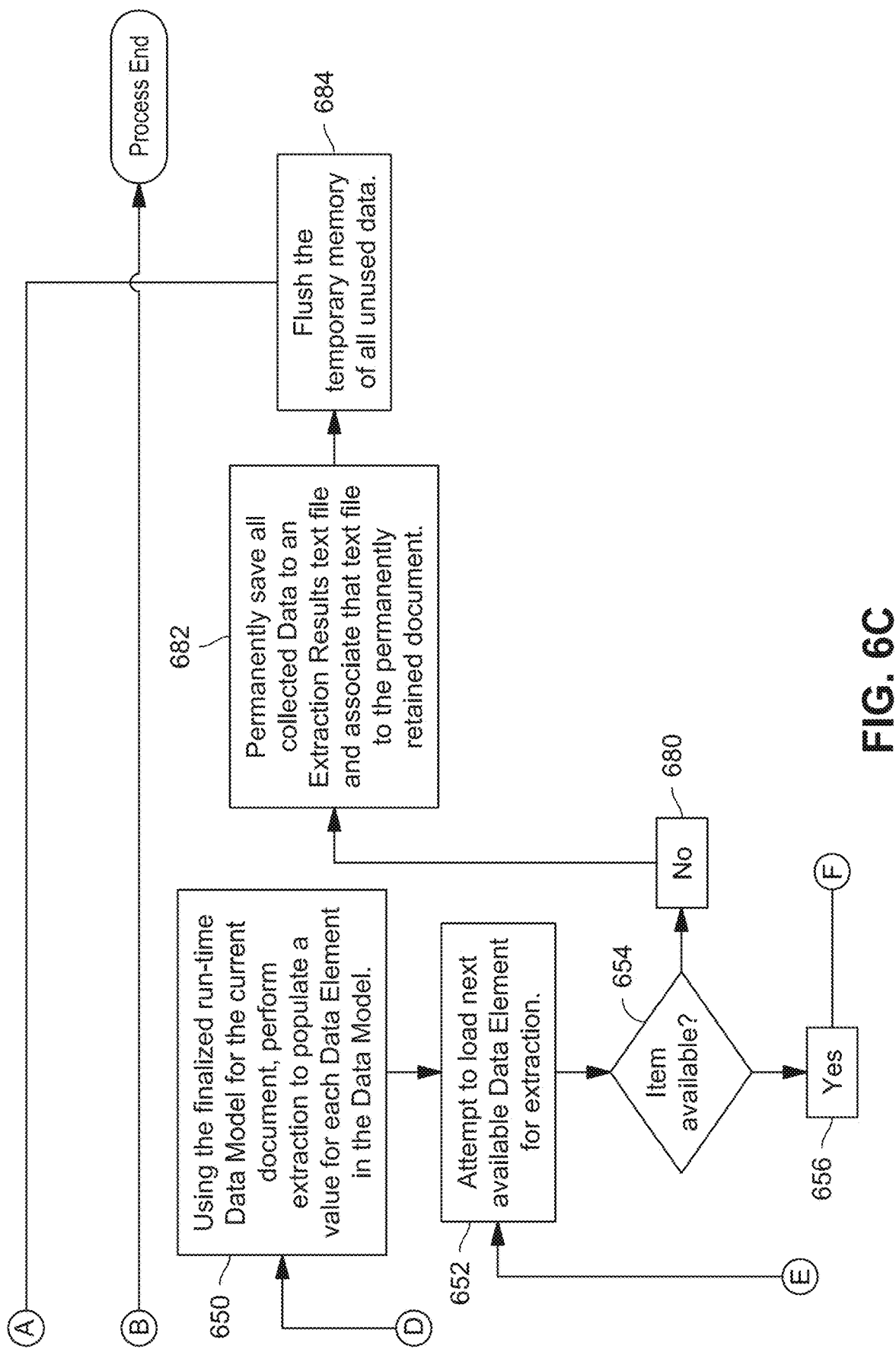
FIG. 6C is a flow diagram illustrating part of a process that employs an OCR system, such as the system illustrated in FIG. 1, to extract data from one or more documents based on respective data extraction models, in accordance with an example implementation of the present disclosure.
Figure 6D:
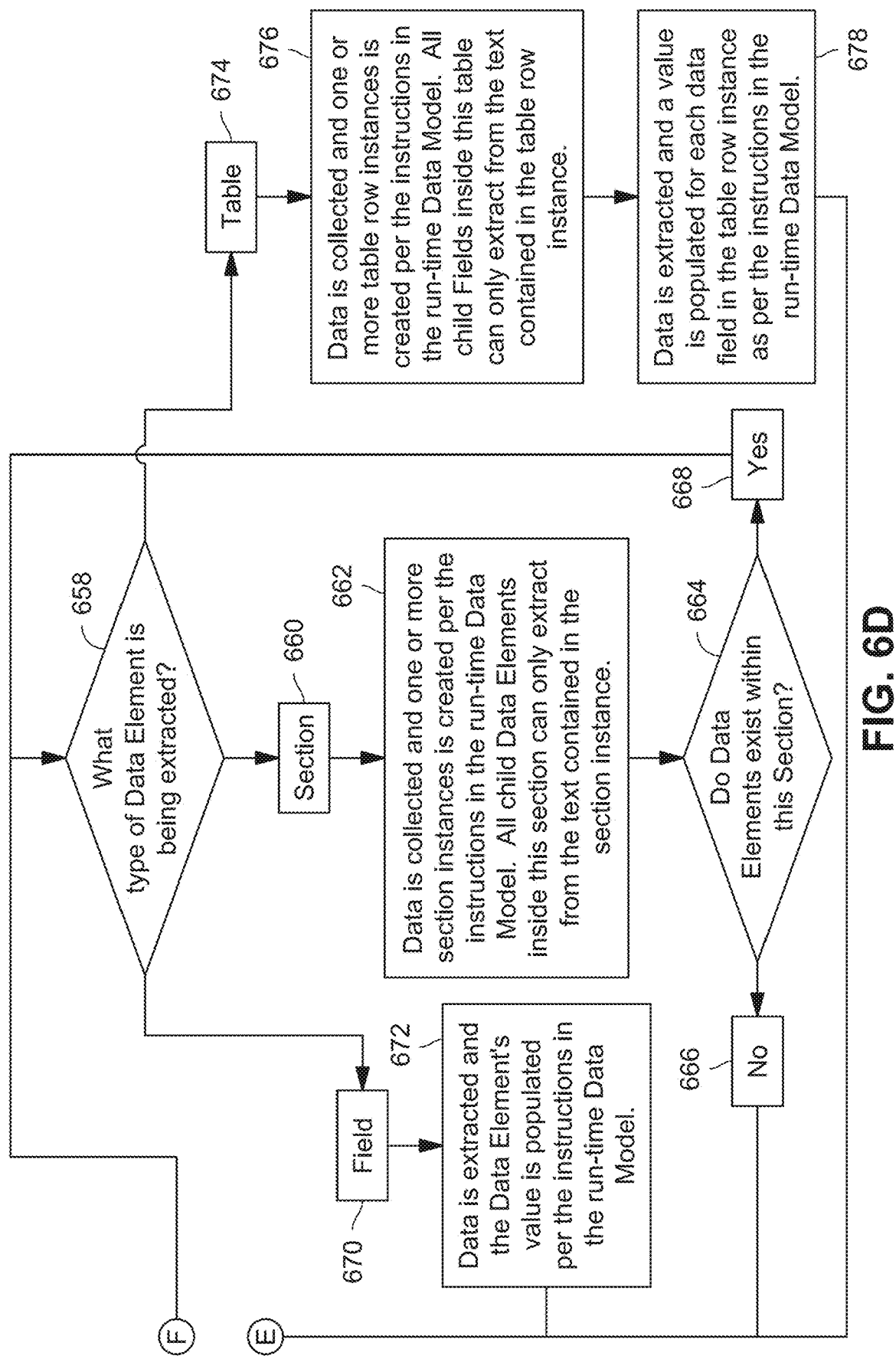
FIG. 6D is a flow diagram illustrating part of a process that employs an OCR system, such as the system illustrated in FIG. 1, to extract data from one or more documents based on respective data extraction models, in accordance with an example implementation of the present disclosure.

FIGS. 5A and 5B illustrate a process 500 for classifying one or more documents/images for OCR-based data extraction, in accordance with an example implementation of the present disclosure. The controller 106 can be configured to load pre-configured document classification settings (block 502). For example, the controller 106 can be configured to load document content types and/or models based on default settings and/or user selection(s). The controller 106 may load a classification task list, such as the classification task list generated at the end of process 400 (block 504). The controller 106 may begin to process each item (e.g., document/image) in the classification task list (block 506). For example, the controller 106 can be configured to determine if any items are available in the task list (e.g., items that are waiting to be processed) (block 508). When items that have not yet been classified are available (block 512), the controller 106 is configured to identify a list of eligible content types within the content model as configured in the classification settings (block 514). For example, the controller 106 can be configured to detect an identifier and/or one or more data types in the document and determine whether the identifier and/or data types correspond to a content type and/or model stored in memory. The controller 106 is configured to determine whether there is at least a threshold correspondence to a stored content type and/or model (block 516). If a candidate is identified (e.g., a content type and/or model that meets the threshold correspondence) (blocks 518 and 520), the controller 106 is configured to automatically classify the document/image as corresponding to the candidate content type and/or model (block 522). When a candidate cannot be identified (e.g., no content type meets the threshold correspondence) (blocks 518 and 524), the controller 106 may be configured to prompt a user (e.g., via communication interface 114) to manually select or enter a content type and/or model that corresponds to the document/image being analyzed (block 526). The controller 106 may classify the next items in the classification task list in the same manner until all items (e.g., documents/images) have been classified (block 510). In implementations, the controller 106 may generate another task list (data extraction task list) for extracting data elements from each of the documents that were classified as corresponding to a content type and/or model (block 528). The controller 106 may be configured to submit/store the data extraction task list for use in the OCR-based data extraction process 600 (block 530).

FIGS. 6A through 6D illustrate a process 600 for extracting data from one or more documents based on respective data extraction models, in accordance with an example implementation of the present disclosure. The controller 106 can be configured to load pre-configured document data extraction settings (block 602). For example, the controller 106 can be configured to load data models assigned to documents and/or corresponding to document content types based on default settings and/or user selection(s). The controller 106 may load a data extraction task list, such as the data extraction task list generated at the end of process 500 (block 604). The controller 106 may begin to process each item (e.g., document/image) in the data extraction task list (block 606). For example, the controller 106 can be configured to determine if any items are available in the task list (e.g., items that are waiting to be processed) (block 608). When items that have not yet been processed are available (block 612), the controller 106 is configured to determine a content type for an item being analyzed (block 614). For example, the controller 106 can be configured to detect an identifier and/or one or more data types in the document and determine whether the identifier and/or data types correspond to a content type and/or model stored in memory. In another example, the identifier and/or content type are already assigned (e.g., based on a document classification process 500).

The controller 106 is configured to determine a location in memory (e.g., in a database) of the content type and generate a hierarchical content type list that contains a content model and all child content categories working down to the assigned content type (block 616). The controller 106 can then load items (e.g., data types) from the content type list and determine whether the items are available in the document (blocks 618 and 620). When the current document's content type is determined to have parent content models and/or categories in the defined hierarchy (block 622), the controller determines whether the content model and/or category has an assigned data model (block 626). If the item has an assigned data model (block 628), the controller 106 is configured to add each data element from the data type's data model and the associated extraction instructions (e.g., instructions based on the data element model/profile) to the run-time data model for the document (block 630). The controller 106 may also determine whether any data element profiles/overrides for the data type are defined in the content type list (block 632). In there are no data element profiles/overrides for the data type, the controller 106 can proceed to load the next item from the content type list (block 618). If any data element profiles/overrides are present (blocks 634 and 636), the controller 106 can be configured to override any existing instructions in the run-time data extraction model with the instructions specified in the data element profile (block 638). For example, the data element profile/override can be defined by a user manually and/or pre-defined for particular documents, different versions of documents (e.g., different formats, different originators/entities, etc.), and so forth. After updating the run-time data extraction model for the document, the controller 106 is configured to load the next item from the content type list (block 618).

In implementations, the controller 106 can access a hierarchical data model from memory. Data types can be pre-defined (e.g., programmed in memory 110) and/or dynamically defined by an administrator (e.g., via user inputs). The data types can be associated with respective patterns of characters and arranged in a hierarchical model that relates the data types with one another, for example, data types may define portions of the document that are nested in one another (i.e., arranged according to a hierarchy). Three key types of data elements may exist within a model. A "section" can generally represent a section of a document. Once this section is found within a document, all child data elements may only consider the text within the section for the purposes of data collection. This prevents those elements from being able to accidentally collect information from a different portion of the document. Any section may also have sub-sections. Sections can also be specified as a single or multiple instance section. At run-time, the pattern that defines a section may return one or more instances. This can be useful for repeating sections such as the month (e.g., month 802/902) and category (category 804/904) sections in the examples shown in FIGS. 8 through 13. In order to determine the flow of a document with multiple columns, the controller 106 can be configured to search for patterns to identify each data element within a section. The controller 106 can be configured to then combine all matches via vertical overlap. This means that if any pixel of the bounding rectangle of a match overlaps vertically with any other pixel of another match, the instances and all text between the two will be combined. Then, the resulting combined sections are combined in flow order to assist with multi-column and multi-page document processing. A "table" can represent a table containing a variable number of rows. A pattern is used to define a row of information. Then this pattern is allowed to return all table row instances located within its parent data element. A "field" can represent the lowest level value or table cell that is to be extracted from the document. In an example shown in FIG. 8, a document image 800 includes: a heading 801 (e.g., Document Title); month labels 802 that identify sections 803; category labels 804 that identify sub-sections 805 nested within a section 803 (e.g., below the month label 802); a table 806 with various row entries/values; and so forth. This hierarchy can define a data extraction model for the document.

In embodiments, the controller 106 is configured to perform a hierarchical OCR based data extraction process that includes the following. The controller 106 is configured to perform an OCR pass on an image to identify a plurality of characters of the image. The controller 106 is configured to detect a first pattern of characters associated with a first data type by searching for the first pattern of characters in the image. For example, FIG. 9 shows a first data type (e.g., a heading 902) in an image that indicates a location of a first portion (e.g., section 903) of the image. The first data type can indicate a location of a first portion (e.g., section, table, data field, etc.) of the image. For example, the controller 106 can be configured to identify multiple sections 902 associated with headings (e.g., sections below "2018, Month of January" and "2018, Month of February" headings). After the first portion is identified, the controller 106 can be configured to detect a second portion (e.g., sub-section, table, or field) that is located in the first portion. For example, the controller 106 can be configured to detect a second pattern of characters associated with a second data type by searching for the second pattern of characters in the first portion of the image, where the second data type can indicate a field of information or other portion (e.g., sub-section, table, etc.) of the document. For example, FIG. 10 shows a second data type (e.g., a sub-heading 904) in an image that indicates a location of a second portion (e.g., sub-section 905 or table 908) of the image, where the second portion is located in the first portion (e.g., section 903) of the image. Fields (e.g., fields 902, 904, 906, 910, etc.) can be detected in identified portions (e.g., section 903, section/sub-section 905, table 908, etc.) and extracted from the document. For example, one or more identified characters associated with a field located in the first portion or sub-section or table within the first portion of the image can be reported (e.g., transferred to a text file, a database, reported via a user interface device, or the like).

After data types have been associated with respective patterns, for example, when the data types are defined in a hierarchical model, the controller 106 can be configured to extract information from the document by employing the hierarchical model to recognize the patterns and separate out the sections, sub-sections, tables, fields, and so forth. In this manner, information can be extracted from documents with different formatting (e.g., different order of fields within sections) by processing the documents according to the hierarchical model.

The hierarchical data model can employ any number of levels or layers. For example, several portions (e.g., sections, tables, fields, etc.) may be nested within or under one another to implement a multi-layer (e.g., two layer, three layer, four layer, etc.) hierarchical model. Fields of information belonging to particular sections can be identified and extracted even when several instances of the same data type, possibly having the same pattern of characters, exist in a document. For example, table headers for "Category is below: A1" of the section associated with "2018, Month of January" can be identified by drilling down into the "2018, Month of January" section and the "Category is below: A1" sub-section of the document, as is illustrated in FIGS. 9 through 13.

As described herein, the controller 106 can be configured to modify (e.g., apply an override or rule change to) a hierarchical model (or a zone-based data extraction model) by employing data element profiles and overrides based on a content type of the document being processed. The purpose of such modifications is to assign different rules for one or more of the data elements in a document based on the classification of the document. At any point in data element hierarchy, a data element profile for any data element (e.g., section, table, or field) in the data model may be defined. If, for example, a data element profile is defined for a specific field at a category level, that profile will be leveraged for all child content types of that category unless they are given their own data element profiles. Prior to extracting data from a document, the document can be assigned a content type either manually or through automation. The overall model for a particular process may contain any combination of categories and document types (e.g., as shown in FIG. 7). The hierarchical model 700 in FIG. 7 includes data models 702 that can include data extraction models for various content categories 706, sub-categories 706, and document types. Collectively, categories and document types are referred to herein as "content types."

In an example implementation, the controller 106 can be configured to employ a first data extraction model (e.g., a base hierarchical model) that may be assigned for a first content type. For example, the first data extraction model can include definitions for a plurality of data types associated with the first content type. To process a document, the controller 106 can perform an OCR on an image of the document to identify a plurality of characters of the image. As discussed above, the content type can be manually selected (e.g., via user input) or can be automatically determined. For example, the content type for the image may be inferred from an identifier (e.g., a logo or pattern of characters). In some embodiments, the controller 106 is configured to detect an identifier (e.g., heading 801/901) associated with a content type in the image (e.g., document image 800/900).

After the content type is selected by a user or determined by the controller 106, the controller 106 can be configured to apply a rule change for the first data extraction model when the identifier is associated with the second content type. For example, after detecting that the image is associated with a second content type (different from the first content type), at least one data element profile can be added or applied for the model. Examples of rules that can be changes include, but are not limited to, visibility (e.g., is the field visible to end-users), whether or not the system will require the field to be entered, the presence or absence of particular data types and/or whether or not a data type is used to perform extraction. In some implementations, the data element profile can be added or applied for the model (e.g., for the run-time data extraction model) when the controller 106 is unable to ascertain a data model for a document or for one or more data elements in a document. FIGS. 7 and 8 show examples two different versions of a sample document (i.e., two images associated with different content types). Because of the formatting and/or field labeling, the documents may require different pattern definitions and extraction instructions for flow and for data elements (e.g., Month, Category, Table Header, Table Row, and Total Value). For instance, the "Total Entries" field does not exist on Document (Style B), in FIG. 9, but is included in the document version shown in FIG. 8. In an example implementation, when the document being processed can be identified as the content type associated with Document (Style B), the controller 106 can be configured to apply a data element profile that includes instructions for hiding the "Total Entries" field from users (i.e., not displaying it in a user interface) and/or disabling automated extraction for that field.

When all items (e.g., data types/elements) in the document have been assigned instructions in the run-time data extraction model (block 624), the controller 106 is configured to preform OCR-based data extraction on the document using the finalized run-time data extraction model (block 650). The controller 106 is configured to perform data extraction based on the hierarchy of data types in the run-time model for the document. For example, the controller 106 is configured to load data elements for extraction (block 652). In implementations, the controller 106 is configured to detect a pattern of characters associated with a data type by searching for the pattern of characters in the image. If the data type is available in the image (blocks 654 and 656), the controller 106 is configured to determine what type of data element is being extracted (block 658). For example, the data type can indicate a data element associated with a portion (e.g., section, table, and/or field) of the image. If the data type corresponds to a section (block 660), the controller 106 is configured to collect data within the section (e.g., headings, fields, and/or table entries) from the OCR results by searching within the section based on the run-time data extraction model that defines the hierarchy of data elements within the document (e.g., sections, sub-sections, tables, fields, etc.) (block 662). For example, data elements can be nested within or below other data elements (e.g., sub-sections or tables within sections, and/or fields within a section, sub-section, and/or table, and so forth). The controller 106 is configured to determine whether data elements exist within a portion of the image corresponding to the section (block 664). For example, the controller 106 may detect a second pattern of characters associated with a second data type (e.g., a sub-section, table, or field) by searching for the pattern of characters in the portion of the image corresponding to the section. If there are no data elements within the section (block 666), the controller 106 loads the next available data element for extraction (block 652). If the data element (e.g., within the image and/or within a section) is a field (e.g., name, value, label, or other field of information) (block 670), the controller 106 is configured to collect the data (e.g., the field value, text, etc.) from the OCR results (block 672). If the data element (e.g., within the image and/or within a section) is a table (block 674), the controller 106 is configured to collect the data (e.g., fields) from OCR results of the table row and/or column instances based on the run-time data extraction model (blocks 676 and 678).

The controller 106 continues to load data elements for extraction (block 652) until all items have been extracted from the document/image (block 680). The controller 106 is configured to save all collected data to an extraction results file and associate the extraction results with the document/image stored in memory (block 682). The controller 106 may then flush all unused data from temporary memory (block 684) and proceed to extract data from the next document/image according to the data extraction task list (block 606). When the controller 106 has performed data extraction on all of the documents/images in the data extraction task (block 610), the process 600 may terminate.

CONCLUSION

The various functions, operations, processing blocks, or steps described throughout the present disclosure may be carried out in any order, by any combination of hardware, software, or firmware. For example, controller 106 may be configured to execute any of the functions, operations, steps, or processing blocks described herein. In embodiments, the controller 106 can include one or more of the following: electronic circuitry, logic gates, multiplexers, a programmable logic device, an application-specific integrated circuit (ASIC), a controller/microcontroller, or a computing system (e.g., personal computer, server, mobile device (e.g., notebook, smartphone, or tablet), or the like). The controller 106 can include any device having at least one processor (e.g., processor 108) configured to execute program instructions (e.g., software modules, such as OCR modules 112) from a carrier medium (e.g., memory 110). In embodiments, the carrier medium includes a non-transitory signal bearing medium or storage medium such as, but not limited to, a magnetic or optical disk, a solid-state or flash memory device, or the like.

It is contemplated that any embodiment of the disclosure, manifested above as a system or method, may include at least a portion of any other embodiment described herein. Those having skill in the art will appreciate that there are various embodiments by which systems and methods described herein can be implemented, and that the implementation will vary with the context in which an embodiment of the disclosure is deployed. Furthermore, it is to be understood that the present application is defined by the appended claims. Although embodiments of the present application have been illustrated and described herein, it is apparent that various modifications may be made by those skilled in the art without departing from the scope and spirit of this disclosure.

What is claimed is:

1. A method for dynamic optical character recognition based data extraction, comprising:
analyzing an image;
detecting a first identifier associated with a first content type in an image;
providing a first data extraction model for the first content type, the first data extraction model including definitions for a plurality of data types;
performing an optical character recognition pass on the image to identify a plurality of characters of the image; and
extracting a set of data elements from the image based on the first data extraction model and the plurality of characters of the image identified by performing the optical character recognition pass on the image, the set of data elements corresponding to a chosen expression pattern, the chosen expression pattern including a plurality of at least one of numbers and letters arranged in a chosen format, the set of data elements including a plurality of distinct items to be extracted by optical character recognition from the image, the plurality of distinct items corresponding to the chosen expression pattern.

2. The method of claim 1, further comprising:
analyzing a second image;
detecting a second identifier associated with a second content type in the second image;
providing a second data extraction model for the second content type, the second data extraction model including definitions for a second plurality of data types;
performing an optical character recognition pass on the second image to identify a plurality of characters of the second image; and
extracting a second set of data elements from the second image based on the second data extraction model and the plurality of characters of the second image identified by performing the optical character recognition pass on the second image, the second set of data elements corresponding to a second chosen expression pattern, the second chosen expression pattern including a plurality of at least one of numbers and letters arranged in a chosen format, the second set of data elements including a second plurality of distinct items to be extracted from the image corresponding to the second chosen expression pattern.

3. The method of claim 2, wherein the first data extraction model and the second data extraction model are stored in a memory.

4. The method of claim 1, further comprising:
analyzing a second image;
detecting a second identifier associated with a second content type in the second image;

applying a rule change to modify the first data extraction model based on the second identifier associated with the second content type;
performing an optical character recognition pass on the second image to identify a plurality of characters of the second image; and
extracting a second set of data elements from the second image based on a modified version of the first data extraction model and the plurality of characters of the second image identified by performing the optical character recognition pass on the second image.

5. The method of claim 4, wherein the rule change is based on a pre-programmed override including a data element profile for the first data extraction model, wherein the data element profile is associated with at least one data element in relation to the second content type.

6. The method of claim 4, wherein the rule change is based upon a user-specified override including a data element profile for the first data extraction model, wherein the data element profile is associated with at least one data element in relation to the second content type.

7. The method of claim 6, further comprising:
presenting an alert when the second identifier associated with the second content type is detected, the alert prompting a user to determine whether the first data extraction model is valid for the second content type; and
receiving a user input including the user-specified override for the first data extraction model.

8. A system for dynamic optical character recognition based data extraction, comprising:
a controller including at least one processor configured to execute one or more modules stored by a memory that is communicatively coupled to the at least one processor, the one or more modules, when executed, causing the processor to:
analyze an image;
detect a first identifier associated with a first content type in an image;
provide a first data extraction model for the first content type, the first data extraction model including definitions for a plurality of data types;
perform an optical character recognition pass on the image to identify a plurality of characters of the image; and
extract a set of data elements from the image based on the first data extraction model and the plurality of characters of the image identified by performing the optical character recognition pass on the image, the set of data elements corresponding to a chosen expression pattern, the chosen expression pattern including a plurality of at least one of numbers and letters arranged in a chosen format, the set of data elements including a plurality of distinct items to be extracted by optical character recognition from the image, the plurality of distinct items corresponding to the chosen expression pattern.

9. The system of claim 8, wherein the one or more modules, when executed, cause the processor to:
analyze a second image;
detect a second identifier associated with a second content type in the second image;
provide a second data extraction model for the second content type, the second data extraction model including definitions for a second plurality of data types;
perform an optical character recognition pass on the second image to identify a plurality of characters of the second image; and
extract a second set of data elements from the second image based on the second data extraction model and the plurality of characters of the second image identified by performing the optical character recognition pass on the second image, the second set of data elements corresponding to a second chosen expression pattern, the second chosen expression pattern including a plurality of at least one of numbers and letters arranged in a chosen format, the second set of data elements including a second plurality of distinct items corresponding to the second chosen expression pattern.

10. The system of claim 9, wherein the first data extraction model and the second data extraction model are stored in the memory.

11. The system of claim 8, wherein the one or more modules, when executed, cause the processor to:
analyze a second image;
detect a second identifier associated with a second content type in the second image;
apply a rule change to modify the first data extraction model based on the second identifier associated with the second content type;
perform an optical character recognition pass on the second image to identify a plurality of characters of the second image; and
extract a second set of data elements from the second image based on a modified version of the first data extraction model and the plurality of characters of the second image identified by performing the optical character recognition pass on the second image, the second set of data elements corresponding to a second chosen expression pattern, the second chosen expression pattern including a plurality of at least one of numbers and letters arranged in a chosen format, the second set of data elements including a second plurality of distinct items corresponding to the second chosen expression pattern.

12. The system of claim 11, wherein the rule change is based on a pre-programmed override including a data element profile for the first data extraction model, wherein the data element profile is associated with at least one data element in relation to the second content type.

13. The system of claim 11, wherein the rule change is based upon a user-specified override including a data element profile for the first data extraction model, wherein the data element profile is associated with at least one data element in relation to the second content type.

14. The system of claim 13, wherein the one or more modules, when executed, cause the processor to:
present an alert, via a display communicatively coupled to the processor, when the second identifier associated with the second content type is detected, the alert prompting a user to determine whether the first data extraction model is valid for the second content type; and
receive a user input, via an input device communicatively coupled to the processor, the user input including the user-specified override for the first data extraction model.

15. A system for dynamic optical character recognition based data extraction, comprising:
an imaging device;
a controller in communication with the imaging device, the controller including at least one processor configured to execute one or more modules stored by a memory that is communicatively coupled to the at least one processor, the one or more modules, when executed, causing the processor to:

analyze an image received from the imaging device;

detect a first identifier associated with a first content type in an image;

provide a first data extraction model for the first content type, the first data extraction model including definitions for a plurality of data types;

perform an optical character recognition pass on the image to identify a plurality of characters of the image; and extract a set of data elements from the image based on the first data extraction model and the plurality of characters of the image identified by performing the optical character recognition pass on the image, the set of data elements corresponding to a chosen expression pattern, the chosen expression pattern including a plurality of at least one of numbers and letters arranged in a chosen format, the set of data elements including a plurality of distinct items to be extracted by optical character recognition from the image, the plurality of distinct items corresponding to the chosen expression pattern.

16. The system of claim 15, wherein the one or more modules, when executed, cause the processor to:

analyze a second image received from the imaging device;

detect a second identifier associated with a second content type in the second image;

provide a second data extraction model for the second content type, the second data extraction model including definitions for a second plurality of data types;

perform an optical character recognition pass on the second image to identify a plurality of characters of the second image; and extract a second set of data elements from the second image based on the second data extraction model and the plurality of characters of the second image identified by performing the optical character recognition pass on the second image, the second set of data elements corresponding to a second chosen expression pattern, the second chosen expression pattern including a plurality of at least one of numbers and letters arranged in a chosen format, the second set of data elements including a second plurality of distinct items corresponding to the second chosen expression pattern.

17. The system of claim 15, wherein the one or more modules, when executed, cause the processor to:

analyze a second image received from the imaging device;

detect a second identifier associated with a second content type in the second image;

apply a rule change to modify the first data extraction model based on the second identifier associated with the second content type;

perform an optical character recognition pass on the second image to identify a plurality of characters of the second image; and extract a second set of data elements from the second image based on a modified version of the first data extraction model and the plurality of characters of the second image identified by performing the optical character recognition pass on the second image, the second set of data elements corresponding to a second chosen expression pattern, the second chosen expression pattern including a plurality of at least one of numbers and letters arranged in a chosen format, the second set of data elements including a second plurality of distinct items corresponding to the second chosen expression pattern.

18. The system of claim 17, wherein the rule change is based on a pre-programmed override including a data element profile for the first data extraction model, wherein the data element profile is associated with at least one data element in relation to the second content type.

19. The system of claim 17, wherein the rule change is based upon a user-specified override including a data element profile for the first data extraction model, wherein the data element profile is associated with at least one data element in relation to the second content type.

20. The system of claim 19, wherein the one or more modules, when executed, cause the processor to:

present an alert, via a display communicatively coupled to the processor, when the second identifier associated with the second content type is detected, the alert prompting a user to determine whether the first data extraction model is valid for the second content type; and receive a user input, via an input device communicatively coupled to the processor, the user input including the user-specified override for the first data extraction model.

* * * * *